(12) United States Patent
Wang et al.

(10) Patent No.: US 12,306,371 B2
(45) Date of Patent: May 20, 2025

(54) LAYERED THERMOCHROMIC DEVICE FOR ENHANCED INFRARED EMISSION, AND METHOD FOR MAKING THE SAME

(71) Applicants: Liping Wang, Chandler, AZ (US); Linshuang Long, Hefei (CN); Sydney Taylor, Charlestown, RI (US)

(72) Inventors: Liping Wang, Chandler, AZ (US); Linshuang Long, Hefei (CN); Sydney Taylor, Charlestown, RI (US)

(73) Assignee: Arizona Board of Regents on Behalf of Arizona State University, Scottsdale, AZ (US)

( * ) Notice: Subject to any disclaimer, the term of this patent is extended or adjusted under 35 U.S.C. 154(b) by 286 days.

(21) Appl. No.: 17/831,160

(22) Filed: Jun. 2, 2022

(65) Prior Publication Data
US 2023/0086022 A1   Mar. 23, 2023

Related U.S. Application Data

(60) Provisional application No. 63/208,419, filed on Jun. 8, 2021, provisional application No. 63/196,214, filed on Jun. 2, 2021.

(51) Int. Cl.
*G02B 1/00* (2006.01)
*F28F 13/18* (2006.01)

(52) U.S. Cl.
CPC ............. *G02B 1/002* (2013.01); *F28F 13/18* (2013.01); *F28F 2245/06* (2013.01)

(58) Field of Classification Search
CPC .................................. G02B 1/002; G02B 5/208
See application file for complete search history.

(56) References Cited

U.S. PATENT DOCUMENTS

| | | | |
|---|---|---|---|
| 2014/0170420 A1* | 6/2014 | Jun | C03C 17/27 428/428 |
| 2015/0234221 A1* | 8/2015 | Anderson | G02B 5/3058 445/24 |
| 2020/0353728 A1* | 11/2020 | de Melo Kort-Kamp | F24S 70/10 |

OTHER PUBLICATIONS https://www.semicore.com/news/89-what-is-e-beam-evaporation#:~:text=E%2DBeam%20or%20Electron%20Beam,the%20material%20to%20be%20coated (Year: 2016).*

(Continued)

*Primary Examiner* — Sean M DeGuire
*Assistant Examiner* — Alexander N. Lee
(74) *Attorney, Agent, or Firm* — Fuller IP Law LLC

(57) ABSTRACT

A layered thermochromic device for enhanced infrared emission, and method for creating the same is disclosed. The method includes deposing a spacer layer of $HfO_2$ upon a metallic layer, spin coating the spacer layer with photoresist, exposing the photoresist with a photomask, creating a plurality of holes in the photoresist, and deposing vanadium on the photoresist and the plurality of holes, filling the holes and forming vanadium microdisks on the spacer layer. The method also includes removing the photoresist and the vanadium deposed on the photoresist, and forming a thermochromic layer having $VO_2$ coupled to the spacer layer through direct oxidation of the deposed vanadium microdisks by heating the device in a furnace under a nitrogen/oxygen flow. The device includes a metallic layer, a spacer layer coupled to the metallic layer, and a thermochromic layer deposed on the spacer layer opposite the metallic layer.

5 Claims, 16 Drawing Sheets

(56) References Cited

OTHER PUBLICATIONS

"Inverting the thermal radiative contrast of vanadium dioxide by metasurfaces based on localized gap-plasmons", Kota Ito; Toshio Watari; Kazutaka Nishikawa; Hiroshi Yoshimoto; Hideo Iizuka, APL Photonics 3, 086101 (2018) (Year: 2018).*

"Spectrally-selective vanadium dioxide based tunable metafilm emitter for dynamic radiative cooling", Sydney Taylor, Linshuang Long, Ryan McBurney, Payam Sabbaghi, Jeremy Chao, Liping Wang, Solar Energy Materials and Solar Cells, vol. 217, 2020, 110739. (Year: 2020).*

Abbas, S., Dupont, L.M., Dozov, I.N., Davidson, P., Chanéac, C., "Optical filter based on Fabry-Perot structure using a suspension of goethite nanoparticles as electro-optic material", Proc. SPIE 10555, Emerging Liquid Crystal Technologies XIII, 105550G (2018), doi:10.1117/12.2301290.

Alipour-Banaei, H., Mehdizadeh, F., "Significant role of photonic crystal resonant cavities in WDM and DWDM communication tunable filters", Optik 124 (17) (2013) 2639-2644 (Stuttg), doi:10.1016/j.ijleo.2012.07.029.

Barker, Jr, A.S., Verleur, H.W., Guggenheim, H.J., "Infrared optical properties of vanadium dioxide above and below the transition temperature", Phys. Rev. Lett. 17 (26) (1966) 2137-2140.

Bierman, D.M., et al., "Radiative thermal runaway due to negative-differential thermal emission across a solid-solid phase transition", Phys. Rev. Appl. 10 (2) (2018) 1-6, doi:10.1103/PhysRevApplied.10.021001.

Cesarini, G., Leahu, G., Belardini, A., Centini, M., Li Voti, R., Sibilia, C., "Quantitative evaluation of emission properties and thermal hysteresis in the mid-infrared for a single thin film of vanadium dioxide on a silicon substrate", Int. J. Therm. Sci. 146 (2019) 106061, doi:10.1016/j.ijthermalsci.2019.106061.

Cesarini, G., Leahu, G., Voti, R.L., Sibilia, C., "Long-wave infrared emissivity charac-terization of vanadium dioxide-based multilayer structure on silicon substrate by temperature-dependent radiometric measurements", Infrared Phys. Technol. 93 (2018) 112-115, doi:10.1016/j.infrared.2018.07.032.

Cesca, T., et al., "Correlation between in situ structural and optical character-ization of the semiconductor-to-metal phase transition of VO2 thin films on sapphire", Nanoscale 12 (2) (2020) 851-863, doi:10.1039/c9nr09024j.

Chain. E.E., "Optical properties of vanadium dioxide and vanadium pentoxide thin films," Appl. Opt. 30 (19) (1991) 2782, doi:10.1002/pssa.2211530218.

Chang, T., et al., "Optical design and stability study for ultrahigh-performance and long-lived vanadium dioxide-based thermochromic coatings", Nano Energy 44 (2018) 256-264 Oct. 2017, doi:10.1016/j.nanoen.2017.11.061.

Chao, J., Taylor, S., and Wang, L.P., 2022, "Design and Energy Analysis of Tunable Nanophotonic Infrared Filter based on Thermochromic Vanadium Dioxide," International Journal of Heat and Mass Transfer, vol. 186, p. 122515.

Chen, M., Morsy, A.M., Povinelli, M.L., "Design of VO2-coated silicon microspheres for thermally-regulating paint", Opt. Express 27 (15) (2019) 21787, doi:10.1364/ oe.27.021787.

Chodorow, U., Mazur, R., Morawiak, P., Herman, J., Harmata, P., Martyniuk, P., "Switchable Fabry-Perot filter for mid-infrared radiation", Liq. Cryst. 46 (12) (2019) 1877-1880, doi: 10.1080/02678292.2019.1613576.

Coskun, O.D., Demirel, S., Atak, G., "The effects of heat treatment on optical, structural, electrochromic and bonding properties of Nb2 O5 thin films", J. Al-loy. Compd. 648 (2015) 994-1004, doi:10.1016/j.jallcom.2015.07.053.

Demiryont, H., Moorehead, D., "Electrochromic emissivity modulator for space-craft thermal management", Sol. Energy Mater. Sol. Cells 93 (12) (2009) 2075-2078, doi:10.1016/j.solmat.2009.02.025.

Franke, E.B., Trimble, C.L., Hale, U.S., Schubert, M., Woollam, J.A., "Infrared switch-ing electrochromic devices based on tungsten oxide", J. Appl. Phys. 88 (10) (2000) 5777-5784, doi:10.1063/1.1319325.

Hale, J.S., DeVries, M., Dworak, B., Woollam, J.A., "Visible and infrared optical con-stants of electrochromic materials for emissivity modulation applications", Thin Solid Films 313-314 (1998) 205-209, doi:10.1016/S0040-6090(97) 00818-3.

Ji, H., Liu, D., Cheng, H., Zhang, C., Yang, L., "Vanadium dioxide nanopowders with tunable emissivity for adaptive infrared camouflage in both thermal atmo-spheric windows", Sol. Energy Mater. Sol. Cells 175 (2018) 96-101 Nov. 2017, doi:10.1016/j.solmat.2017.10.013.

Kilian. K.A., Böcking, T., Gaus, K., Gal, M., Gooding, J.J., "Peptide-modified optical filters for detecting protease activity", ACS Nano 1 (4) (2007) 355-361.

Kim, S.J., et al., "Dynamic phase-change metafilm absorber for strong designer modulation of visible light," Nanophotonics 10 (1) (2020) 713-725, doi:10.1515/nanoph-2020-0264.

Larciprete, M.C., et al., "Effect of heating/cooling dynamics in the hysteresis loop and tunable IR emissivity of VO2 thin films", Opt. Express 28 (26) (2020) 39203, doi:10.1364/oe.411556.

Lee, S.J., et al., "Crystalline WO3 nanoparticles for highly improved elec-trochromic applications", Adv. Mater. 18 (6) (2006) 763-766, doi:10.1002/adma.200501953.

Lenz, G., Eggleton, B.J., Madsen, C.K., Giles, C.R., Nykolak, G., "Dispersive properties of optical filters for WDM systems", IEEE Photonics Technol. Lett. 10 (3) (1998) 567-569, doi:10.1109/68.662596.

Li, H . . . , "Refractive index of alkaline earth halides and its wavelength and tem-perature derivatives", J. Phys. Chem. Ref. Data 5 (2) (1976) 329-528, doi:10. 1063/1.555616.

Li, S.Y., Niklasson, G.A., Granqvist, C.G., "Thermochromic fenestration with VO2-based materials: three challenges and how they can be met", Thin Solid Films 520 (10) (2012) 3823-3828, doi:10.1016/j.tsf.2011.10.053.

Long, L., Taylor, S., Ying, X., Wang, L., "Thermally-switchable spectrally-selective infrared metamaterial absorber/ emitter by tuning magnetic polariton with a phase-change VO2 layer", Mater. Today Energy 13 (2019) 214-220, doi:10.1016/ j.mtener.2019.05.017.

Philip, J., Jaykumar, T., Kalyanasundaram, P., Raj, B., "A tunable optical filter, " Meas. Sci. Technol. 14 (8) (2003) 1289-1294, doi:10.1088/0957-0233/14/8/314.

Powell, M.J., et al., "Intelligent multifunctional VO2 /SiO2 /TiO2 coatings for self-cleaning, energy-saving window panels", Chem. Mater. 28 (5) (2016) 1369-1376, doi:10.1021/acs.chemmater.5b04419.

Qazilbash, M.M., et al., "Mott transition in VO2 revealed by infrared spectroscopy and nano-imaging", Science 318 (5857) (2007) 1750-1753 (80-, doi:10.1126/ science.1150124.

Qi, D., Wang, X., Cheng, Y., Chen, F., Liu, L., Gong, R., "Quasi-periodic photonic crys-tal Fabry-Perot optical filter based on Si/SiO2 for visible-laser spectral selectivity", J. Phys. D Appl. Phys. 51 (22) (2018), doi:10.1088/1361-6463/aabf83.

Redel, E., et al., "Electrochromic bragg mirror":ECBM, Adv. Mater. 24 (35) (2012) 265-269, doi:10.1002/adma.201202484.

Sadot, D., Boimovich, E., "Tunable optical filters for dense WDM networks", IEEE Commun. Mag. (1998), doi:10.1201/9781420019520.ch6.

Sun, K., et al., "VO2 thermochromic metamaterial-based smart optical solar reflector", ACS Photonics 5 (6) (2018) 2280-2286, doi:10.1021/acsphotonics. 8b00119.

Tavousi, A., Mansouri-Birjandi, M.A., Janfaza, M., "Optoelectronic application of graphene nanoribbon for mid-infrared bandpass filtering", Appl. Opt. 57 (20) (2018) 5800, doi:10.1364/ao.57.005800.

Taylor, S., Chao, J., Long, L., Vlastos, N., Wang, L., "Temperature-dependent optical characterization of VO2 thin film prepared from furnace oxidation method", ES Mater. Manuf. 6 (2019) 62-67, doi:10.30919/esmm5f607.

Taylor, S., Long, L., McBurney, R., Sabbaghi, P., Chao, J., Wang, L., "Spectrally-selective vanadium dioxide based tunable metafilm emitter for dynamic radiative cooling," Sol. Energy Mater. Sol. Cells 217 (2020) 110739, doi:10.1016/j. solmat.2020.110739.

Taylor, S., Long, L., Wang, L., "Fabrication and characterization of furnace oxidized vanadium dioxide thin films", Thin Solid Films 682 (2019) 29-36, doi:10.1016/j. tsf.2019.05.021.

(56) References Cited

OTHER PUBLICATIONS

Taylor, S., Yang, Y., Wang, L., "Vanadium dioxide based Fabry-Perot emitter for dynamic radiative cooling applications", J. Quant. Spectrosc. Radiat. Transf. 197 (2017) 76-83.

Voti, R.L., Larciprete, M.C., Leahu, G., Sibilia, C., Bertolotti, M., "Optimization of thermochromic VO2 based structures with tunable thermal emissivity", J. Appl. Phys. 112 (3) (2012), doi: 10.1063/1.4739489.

Wang, H., Liu, X., Wang, L., Zhang, Z., "Anisotropic optical properties of silicon nanowire arrays based on the effective medium approximation", Int. J. Therm. Sci. 65 (2013) 62-69, doi:10.1016/j.ijthermalsci.2012.08.018.

Wang, Z., et al., Towards full-color tunability of inorganic electrochromic devices using ultracompact Fabry-Perot nanocavities, Nat. Commun. 11 (1) (2020) 1-9, doi:10.1038/s41467-019-14194-y.

Williams, C., Hong, N., Julian, M., Borg, S., Kim, H.J., "Tunable mid-wave infrared FabryPerot bandpass filters using phase-change GeSbTe", Opt. Express 28 (7) (2020) 1058310594, doi:10.1364/OE.390538.

Wu, S.H., et al., "Thermal homeostasis using microstructured phase-change materials", Optica 4 (11) (2017) 1390, doi:10.1364/optica.4.001390.

Yang, Z., et al., "Reflective color filters and monolithic color printing based on asymmetric Fabry-Perot cavities using nickel as a broadband absorber", Adv. Opt. Mater. 4 (8) (2016) 1196-1202, doi:10.1002/adom.201600110.

\* cited by examiner

LAYERED THERMOCHROMIC DEVICE FOR ENHANCED INFRARED EMISSION, AND METHOD FOR MAKING THE SAME

RELATED APPLICATIONS

This application claims the benefit of U.S. provisional patent application 63/196,214, filed Jun. 2, 2021 titled "Spectrally-Selective Vanadium Dioxide Based Variable-Emittance Coating for Dynamic Radiative Cooling". This application also claims the benefit of U.S. Provisional Application No. 63/208,419, filed Jun. 8, 2021 titled "Scalable Micro-Structured $VO_2$ Metasurfaces for Enhanced Infrared Emission". The entirety of the above referenced disclosures are hereby incorporated herein by this reference.

STATEMENT REGARDING FEDERALLY SPONSORED RESEARCH

This invention was made with government support under NNX16AM63H awarded by the National Aeronautical & Space Administration and under 1454698 awarded by the National Science Foundation. The government has certain rights in the invention.

TECHNICAL FIELD

Aspects of this document relate generally to layered thermochromic devices.

BACKGROUND

Heat can be a problem for a broad range of technologies. Whether there is too much heat, or too little, thermal control can play an important role in applications ranging from terrestrial building materials to spacecraft. Of particular interest is passive thermal control through selective radiative heat dissipation. Specifically, devices or even coatings whose infrared emittance varies with temperature are desirable for a number of applications.

In human spacecraft missions, variable heat rejection radiators can prevent the freezing of transport fluids, enabling single loop thermal control and leading to considerable mass conservation. In robotic missions, variable heat rejection radiators can minimize or eliminate the need for survival heater power by adapting their heat rejection to changes in spacecraft heat load or thermal environment. Thermochromic variable-emittance radiators, which passively change their emittance based on radiator temperature, are an appealing option for variable heat rejection since they require no electrical input to switch and add a small amount of mass.

The performance of radiative heat dissipation through a surface depends heavily on the radiative properties of the surface, which are usually static or a weak function of temperature. Dynamic control of radiative properties has attracted increasing interest because of the ability to adapt to the changing environment and the promise of greater energy savings. One key to dynamic radiative thermal control lies in materials whose radiative properties are tunable in response to external stimuli. Among those chromogenic materials, vanadium dioxide ($VO_2$) attracts lots of research attention as it exhibits a reversible phase transition from an insulating state to a metallic state when its temperature exceeds 68° C. This structural change causes a significant change in infrared optical properties, making $VO_2$ attractive for dynamic radiation control.

However, conventional thermochromic-based coatings and devices suffer from various problems. Some have shown promising results in theoretical studies, but will be difficult to fabricate (e.g., many layers, thick layers, etc.). Others require fabrication methods that will be prohibitively expensive to scale up for practical applications. Still others exhibit a phase transition that occurs outside the temperature range of interest, or they do not have spectral selectivity within the atmospheric IR window. Additionally, few conventional thermochromic-based coatings and devices have been demonstrated to have variable heat rejection in a space-like environment.

One challenge in utilizing $VO_2$ for dynamic thermal control is that the emittance of a pristine $VO_2$ film decreases as it becomes metallic. This means that at high temperatures, when cooling is most desired, the emittance has actually dropped. Nanophotonic and metamaterial structures have been proposed to address this property mismatch and achieve the desired switch of thermal emittance. $VO_2$-based multilayer devices have been theoretically designed for active radiative cooling and radiative thermostats. For example, a metasurface absorber was theoretically proposed that combined $VO_2$ with hBN (hexagonal boron nitride). However, very few studies have experimentally achieved significantly increased emissivity at higher temperatures with $VO_2$-based metamaterials. Additionally, the rare examples that exhibit tunable infrared emittance are fabricated using processes that will be difficult and/or expensive to scale to a level beyond laboratory experiments.

SUMMARY

According to one aspect, a method for creating a layered thermochromic device for enhanced infrared emission includes depositing a spacer layer of $HfO_2$ upon a metallic layer, and spin coating the spacer layer with photoresist, opposite the metallic layer. The method also includes exposing the photoresist with a photomask, creating a plurality of holes in the photoresist, and depositing vanadium on the photoresist and the plurality of holes, filling the holes and forming vanadium microdisks on the spacer layer. The method further includes removing the photoresist and the vanadium deposited on the photoresist, and forming a thermochromic layer having $VO_2$ coupled to the spacer layer through direct oxidation of the deposited vanadium microdisks by heating the device in a furnace under a nitrogen/oxygen flow.

Particular embodiments may comprise one or more of the following features. The metallic layer may be a layer of aluminum deposited on a silicon substrate. The insulating layer of $HfO_2$ may be deposited upon the metallic layer through atomic layer deposition. The vanadium may be deposited using electron beam evaporation.

According to another aspect of the disclosure, a method for creating a layered thermochromic device for enhanced infrared emission includes depositing a spacer layer on a metallic layer, and depositing a thermochromic layer on the spacer layer opposite the metallic layer.

Particular embodiments may comprise one or more of the following features. The metallic layer may be a layer of aluminum deposited on a silicon substrate. Depositing the spacer layer on the metallic layer may include depositing silicon upon the metallic layer through RF magnetron sputtering. Depositing the spacer layer on the metallic layer may include depositing an insulating layer of $HfO_2$ upon the metallic layer through atomic layer deposition. Depositing the thermochromic layer on the spacer layer may include deposing vanadium on the spacer layer, and/or forming $VO_2$ coupled to the spacer layer through direct oxidation of the deposed vanadium by heating the device in a furnace under a nitrogen/oxygen flow. Deposing vanadium on the spacer layer may include spin coating the spacer layer with photoresist, exposing the photoresist with a photomask, creating a plurality of holes in the photoresist, deposing vanadium on the photoresist and the plurality of holes, filling the holes and forming vanadium microdisks on the spacer layer, and/or removing the photoresist and the vanadium deposed on the photoresist. The vanadium may be deposed using electron beam evaporation.

According to yet another aspect of the disclosure, a layered thermochromic device for enhanced infrared emission includes a metallic layer, a spacer layer coupled to the metallic layer, and a thermochromic layer deposited on the spacer layer opposite the metallic layer.

Particular embodiments may comprise one or more of the following features. The metallic layer may be a layer of aluminum deposed on a silicon substrate. The spacer layer may be composed of silicon. The thermochromic layer may include $VO_2$. The thermochromic layer further may include vanadium, in addition to $VO_2$. The spacer layer may be composed of $HfO_2$. The thermochromic layer may include a plurality of microdisks distributed across the spacer layer, repeating with a period. Each microdisk of the plurality of microdisks may include a circular cross section, a diameter, and a height. The height may be at least 100 nm, the diameter may be at most 1.1 μm, and the period may be at least 1.6 μm.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The disclosure will hereinafter be described in conjunction with the appended drawings, where like designations denote like elements, and.

DETAILED DESCRIPTION

Figure 1:
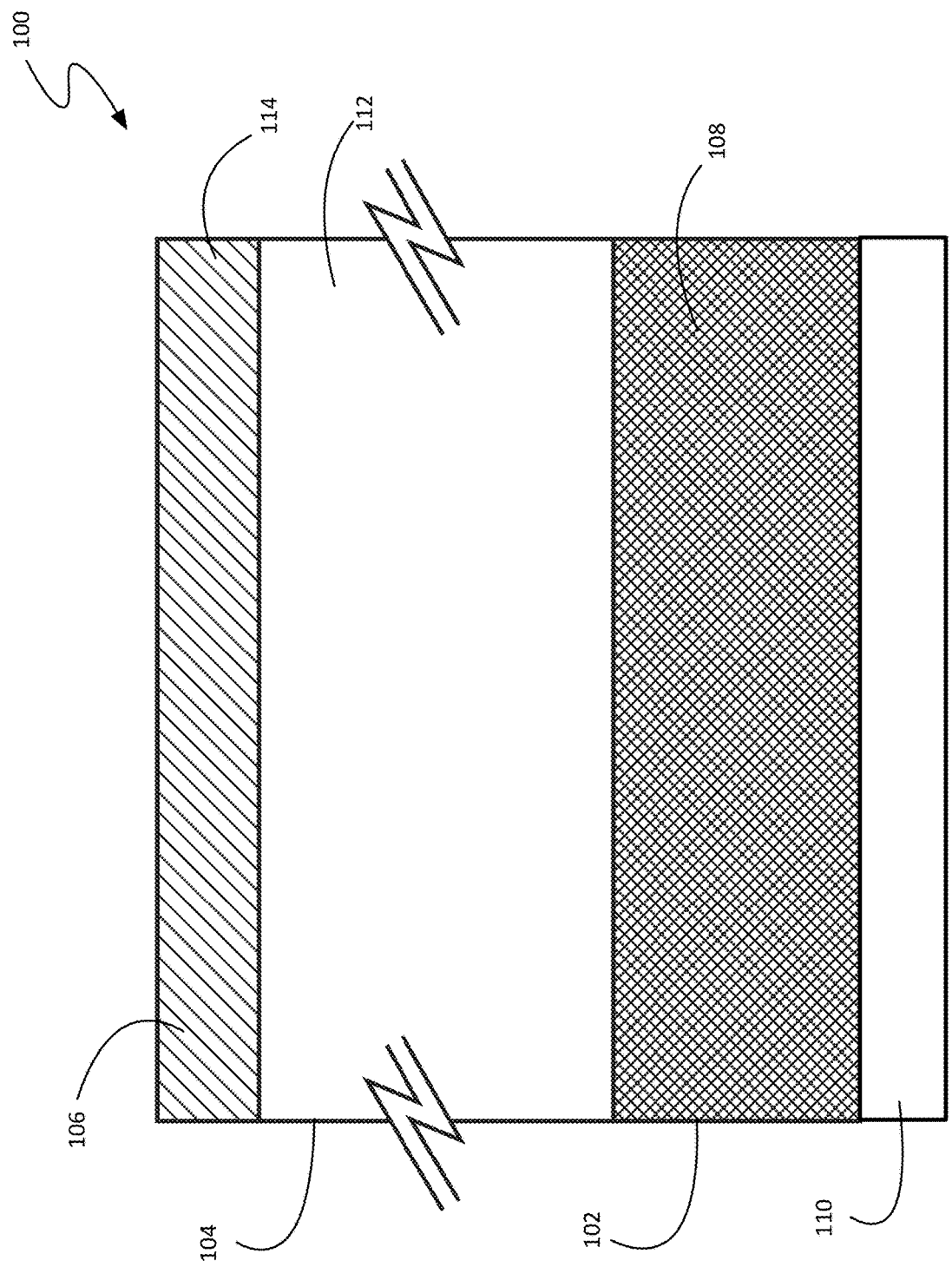
FIG. 1 is a schematic view of a layered thermochromic device for enhanced infrared emission.

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of embodiments in many different forms, there is shown in the drawings and will herein be described in detail particular embodiments with the understanding that the present disclosure is to be considered as an exemplification of the principles of the disclosed methods and systems, and is not intended to limit the broad aspect of the disclosed concepts to the embodiments illustrated.

Heat can be a problem for a broad range of technologies. Whether there is too much heat, or too little, thermal control can play an important role in applications ranging from terrestrial building materials to spacecraft. Of particular interest is passive thermal control through selective radiative heat dissipation. Specifically, devices or even coatings whose infrared emittance varies with temperature are desirable for a number of applications.

In human spacecraft missions, variable heat rejection radiators can prevent the freezing of transport fluids, enabling single loop thermal control and leading to considerable mass conservation. In robotic missions, variable heat rejection radiators can minimize or eliminate the need for survival heater power by adapting their heat rejection to changes in spacecraft heat load or thermal environment. Thermochromic variable-emittance radiators, which passively change their emittance based on radiator temperature, are an appealing option for variable heat rejection since they require no electrical input to switch and add a small amount of mass.

The performance of radiative heat dissipation through a surface depends heavily on the radiative properties of the surface, which are usually static or a weak function of temperature. Dynamic control of radiative properties has attracted increasing interest because of the ability to adapt to the changing environment and the promise of greater energy savings. One key to dynamic radiative thermal control lies in materials whose radiative properties are tunable in response to external stimuli. Among those chromogenic materials, vanadium dioxide ($VO_2$) attracts lots of research attention as it exhibits a reversible phase transition from an insulating state to a metallic state when its temperature exceeds 68° C. This structural change causes a significant change in infrared optical properties, making $VO_2$ attractive for dynamic radiation control.

However, conventional thermochromic-based coatings and devices suffer from various problems. Some have shown promising results in theoretical studies, but will be difficult to fabricate (e.g., many layers, thick layers, etc.). Others require fabrication methods that will be prohibitively expensive to scale up for practical applications. Still others exhibit a phase transition that occurs outside the temperature range of interest, or they do not have spectral selectivity within the atmospheric IR window. Additionally, few conventional thermochromic-based coatings and devices have been demonstrated to have variable heat rejection in a space-like environment.

One challenge in utilizing $VO_2$ for dynamic thermal control is that the emittance of a pristine $VO_2$ film decreases as it becomes metallic. This means that at high temperatures, when cooling is most desired, the emittance has actually dropped. Nanophotonic and metamaterial structures have been proposed to address this property mismatch and achieve the desired switch of thermal emittance. $VO_2$-based multilayer devices have been theoretically designed for active radiative cooling and radiative thermostats. For example, a metasurface absorber was theoretically proposed that combined $VO_2$ with hBN (hexagonal boron nitride). However, very few studies have experimentally achieved significantly increased emissivity at higher temperatures with $VO_2$-based metamaterials. Additionally, the rare examples that exhibit tunable infrared emittance are fabricated using processes that will be difficult and/or expensive to scale to a level beyond laboratory experiments.

Contemplated herein are layered thermochromic devices for enhanced infrared emission, and methods for fabricating the same. Specifically, contemplated herein is a spectrally-selective $VO_2$ based variable-emittance device for enhanced infrared emission and dynamic radiative thermal control. According to various embodiments, this multi-layered, tunable device may be used to create passive, dynamic emitters that decrease thermal emission at low temperatures and increase thermal emission at higher temperatures. The contemplated device decreases its emittance at low temperatures to prevent further temperature decrease through reduced thermal emission loss, and increases its emittance to promote the radiative cooling effect and thereby decrease the temperature when the temperature is higher than the phase transition temperature.

According to various embodiments, the contemplated device exhibits desirable emittance behavior within a desirable temperature range and emits within a desirable spectrum. A fourfold increase in total emittance has been observed in an exemplary device as it increased from room temperature to 100° C. Advantageously, this device emits IR radiation at around 10 μm, which is within the atmospheric IR window. Furthermore, the contemplated device may be fabricated using techniques that are scalable, unlike some conventional $VO_2$-based metamaterials.

This variable thermal emission would be useful for applications in both spacecraft and building thermal management. For spacecraft thermal control, an ideal device would have near-zero emittance to provide a thermal insulation effect when the spacecraft temperature is low to prevent the freezing of transport fluids and electronics. Conversely, at high temperatures the device would have close-to-unity emittance in the broad infrared wavelengths to maximize heat rejection by the radiator. This temperature-dependent behavior would permit the spacecraft to passively respond to changes in internal heat load or thermal environment.

Spacecraft are subjected to extreme temperatures, both cold and hot. Besides exposure to extreme temperatures, thermal cycling may also be of concern for spacecraft thermal control, where the device may be subject to changing heat loads when facing toward or away from the Sun. The device contemplated herein has been demonstrated to have desired dynamic heat rejection, temperature stability, and durable under thermal cycling in extreme environments, like those experienced in space (e.g., 77 K, 200° C.).

Likewise, a tunable radiative device with variable emittance could help to reduce energy consumption in buildings by limiting heat loss in cold weather with low emittance or promoting heat dissipation in warm weather by selectively emitting heat within the 8-13 µm atmospheric window to outer space.

Other embodiments of the contemplated thermochromic $VO_2$-based device comprise nano-sized $VO_2$ structures which are fabricated on a $HfO_2$ surface using an etch-free process, resulting in a $VO_2$ device with improved heat dissipation and emission properties. As a specific example, $HfO_2$ may be deposed on a layer of aluminum. The contemplated nano-structured $VO_2$ device exhibits a three-fold improvement in total emittance and a six-fold increase in radiative thermal conductance upon phase change when compared to a non-nanostructured $VO_2$ film, according to various embodiments. As will be discussed in greater detail below, the augmented infrared emission of some embodiments of the contemplated device is provided through thermally switching the excitation of magnetic polariton (MP).

Advantageous over other $VO_2$-based materials, some embodiments of the contemplated layered thermochromic device are better able to withstand thermal strain. Rather than employing a thin film of $VO_2$, said embodiments comprise an array of $VO_2$ microdisks formed on the surface of a $HfO_2$ layer, and are able to withstand the strain of cycling between two temperatures, repeatedly expanding and contracting. Furthermore, these embodiments of the contemplated device are able to be tuned in ways not available to conventional materials, in theory or practice, without relying on difficult or expensive fabrication methods.

According to various embodiments, these devices may be used for a variety of applications including, but not limited to, near-field thermophotonic devices for noncontact thermal power conversion, radiative refrigeration, heat control, and the like. The structures and methods contemplated herein may be adapted for use with other materials and/or geometries for applications at other wavelengths and/or temperatures.

Furthermore, it should be noted that while this discussion mentions applications within spacecraft and building materials, those are meant to be nothing more than non-limiting examples. Those skilled in the art will recognize that a variable-emittance device for dynamic radiative cooling and thermal control will have a wide range of applications, on Earth and in space.

FIG. 1 is a schematic view of a non-limiting example of a tunable, spectrally-selective, layered thermochromic device for enhanced infrared emission. As shown, the contemplated layered thermochromic device for enhanced infrared emission 100 (hereinafter "device") comprises a metallic layer 102, a spacer layer 104 coupled to the metallic layer 102, and a thermochromic layer 106 deposed on the spacer layer 104 opposite the metallic layer 102. Each will be discussed in greater detail, below.

It should be noted that while the contemplated thermochromic devices contemplated herein are referred to as "devices", according to various embodiments they could also be called metasurfaces, metafilms, coatings, and the like. Those skilled in the art will recognize that the contemplated layered architecture may be referred to using various terms, depending on the context. For example, the non-limiting example of a device 100 shown in FIG. 1, implemented with a metallic layer 102 that includes a silicon substrate 110 may be device-like, while the same structure deposed on the metallic exterior of a spacecraft rather than a mirrored substrate could also be called a coating. While the following disclosure will continue to use the term "device", that term should not be taken to be a limitation. According to various embodiments, the architectures contemplated herein may be implemented in ways that could also be described as surfaces, metasurfaces, metafilms, coatings, and the like, in addition to "device".

According to various embodiments, the device 100 comprises a metallic layer 102 which, combined with the spacer layer 104, forms a Fabry-Perot resonance cavity structure when the thermochromic layer 106 is also metallic. In some embodiments, the metallic layer 102 may be an opaque layer of aluminum 108. For example, in one embodiment, the metallic layer may be an aluminum layer 108 deposed on a silicon substrate 110. In some embodiments, the aluminum layer 108 may have a thickness of 200 nm. In other embodiments, the aluminum layer 108 may be of different thicknesses, so long as it is opaque (i.e., more than 100 nm thick). In some embodiments, the aluminum layer 108 may be a thin aluminum foil, while in other embodiments, the aluminum layer 108 may be a surface of a much larger aluminum structure.

In some embodiments, the device 100 may be applied to an aluminum layer 108. In other embodiments, the device 100 may be applied to other metals including, but not limited to, gold, tungsten, and silver. Aluminum 108 is an attractive material because it is cost effective with sufficiently good optical properties.

The spacer layer 104 is between the metallic layer 102 and the thermochromic layer 106. By separating the two metallic layers (i.e., metallic layer 102 and the thermochromic layer 106 in a metallic state) with the spacer layer 104, a Fabry-Perot resonance cavity may be formed. Modifying this cavity allows the properties of the contemplated device 100 to be tuned. According to some embodiments, the spacer layer 104 is composed of silicon 112. The high refractive index of the silicon 112 enables a much smaller spacer thickness to be used, while the lack of strong phonon modes in the infrared regime makes it possible to achieve spectral selectivity in the atmospheric window, which is advantageous in many applications.

In some embodiments, the thickness of the silicon spacer layer 104 may be 500 nm. The thickness of the spacer layer 104 will mainly shift the spectral emittance peak of the device 100. Other embodiments may employ a different material for the spacer layer 104; however, the thickness would need to be tuned to compensate for the different optical properties, to arrive at the same desired spectral selectivity.

According to various embodiments, the thermochromic layer 106 comprises $VO_2$ 114. In some embodiments, the $VO_2$ 114 may be a thin film. At low temperatures, the $VO_2$ 114 is insulating and the device 100 takes on the high reflectance of the metallic layer 102 (e.g., the aluminum layer 108), thereby minimizing radiation losses. On the other hand, the $VO_2$ 114 is metallic at high temperatures, forming a Fabry-Perot resonance cavity and producing the corresponding emittance enhancement near the resonance wavelength (e.g., $\lambda=10$ µm, etc.). This switch in emittance yields the variable heat rejection sought for in many thermal control applications.

According to various embodiments, the thermochromic layer 106 comprising $VO_2$ 114 is significantly thinner than the spacer 104 and metallic 102 layers. According to various embodiments, the $VO_2$ 114 thickness affects the magnitudes of spectral emittance in both phases, as well as the degree of variation upon thermochromic phase transition. Thus, the various properties of the contemplated thermochromic device 100 may be tuned by simply varying the thickness of the component layers. As a specific example, one embodiment of the contemplated device 100 has a thermochromic layer 106 of $VO_2$ 114 that is 60 nm thick, a silicon spacer layer 104 that is 500 nm thick, and an aluminum 108 metallic layer 102 that is at least 200 nm thick, resulting in a resonance wavelength of roughly 10 µm.

It should be noted that while all of the examples of thermochromic layers 106 discussed herein comprise $VO_2$ 114, those skilled in the art will recognize that the contemplated structures and fabrication methods may be adapted for use with other thermochromic materials.

Some embodiments of the contemplated device 100 may comprise a continuous thermochromic layer 106 that substantially covers the spacer layer 104. This architecture has the benefit of simple and inexpensive fabrication methods, which will be discussed further in the context of FIGS. 4 and 6, below. However, one problem shared by many multilayer devices is that they are not very resilient to thermal stress. Mismatched coefficients of thermal expansion between layers can lead to delamination, cracking, and failure of the device as it cycles between high and low temperatures, the exact conditions where the devices contemplated herein are intended to operate.

Figure 2:
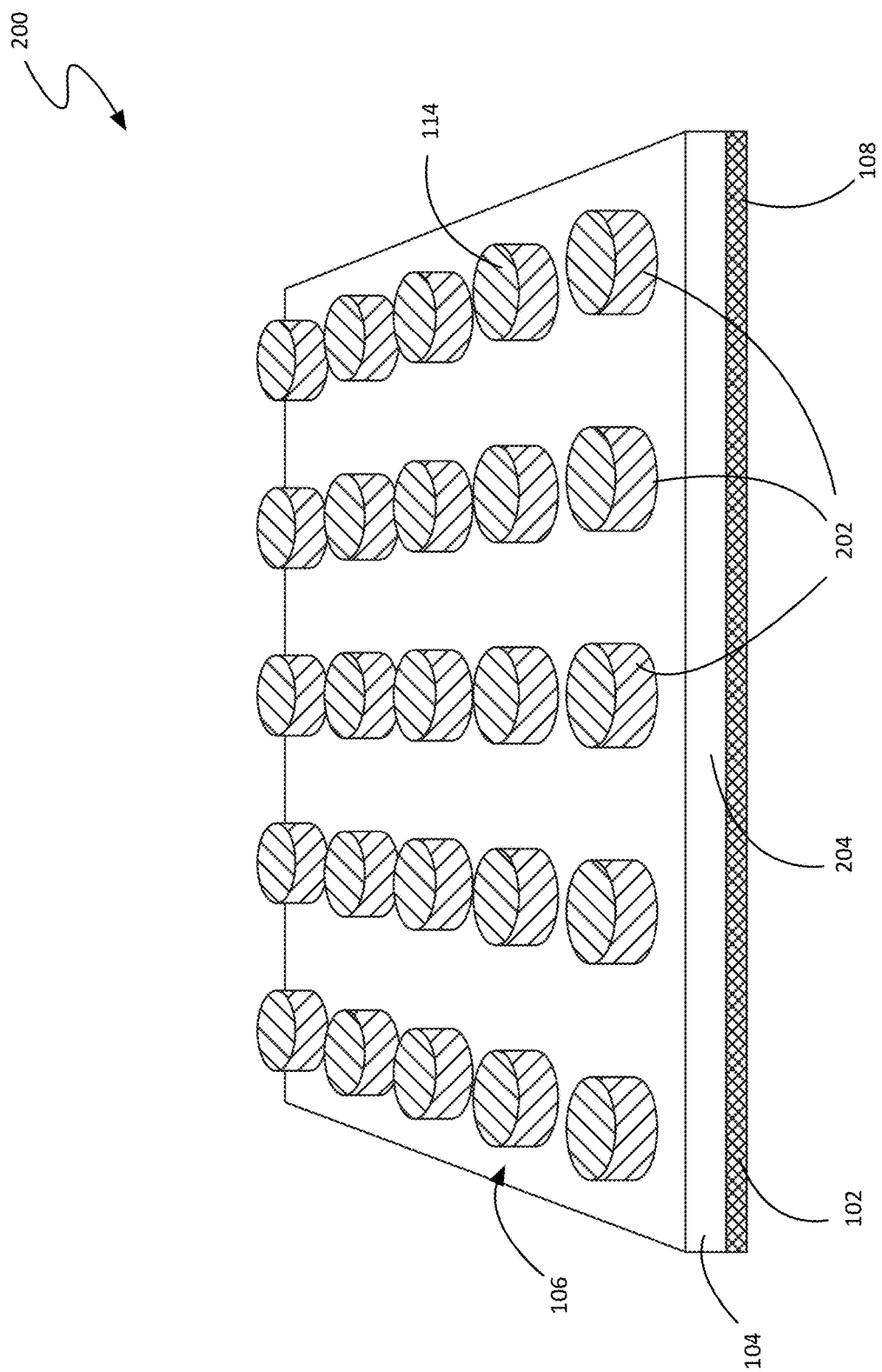
FIG. 2 is a schematic view of another embodiment of a layered thermochromic device for enhanced infrared emission.

FIG. 2 is a schematic view of a non-limiting example of another embodiment of a layered thermochromic device 200 for enhanced infrared emission. Like the device 100 shown in FIG. 1, this device 200 comprises a metallic layer 102 bonded with a spacer layer 104 which is topped with a thermochromic layer 106. As shown, in some embodiments of the contemplated device 200, including the non-limiting example shown in FIG. 2, the thermochromic layer 106 may be composed of a collection of microdisks 202, thermochromic structures that have been deposed on top of the spacer layer 104, but that do not entirely cover the spacer layer 104. The method of fabrication will be discussed in greater detail with respect to FIGS. 5 and 6, below.

According to various embodiments, the spacer layer 104 is composed of $HfO_2$ 204, an insulator. The $HfO_2$ layer serves as an insulator separating the metallic layer 102 (e.g., a layer of aluminum 108, etc.) from a metallic-phase thermochromic layer 106 of $VO_2$ 114 microdisks 202, resulting in a magnetic polariton (MP) excitation leading to the desired emissivity. In some embodiments, this insulating layer may be composed of $HfO_2$ 204, which provides the advantages of being a high temperature material that can be deposed in high quality layers using atomic layer deposition. As a specific example, in one embodiment, the $HfO_2$ 204 spacer layer 104 may be 300 nm thick. Other embodiments may employ a spacer layer 104 composed of different insulators including, but not limited to, aluminum oxide and silicon dioxide.

According to various embodiments, the insulating (e.g., $HfO_2$ 204) spacer layer 104 is deposed on a metallic surface. In some embodiments, including the non-limiting example shown in FIG. 2, the metallic surface may be a thin metallic layer 102. As a specific example, in one embodiment, the metallic layer 102 may be a 200 nm thick layer of aluminum 108. As an option, the metallic layer 102 may be deposited on an appropriate substrate, such as a silicon wafer 110. In other embodiments, the metallic surface may be a surface that is part of a larger metallic structure, such as a device that is the recipient of the dynamic thermal control provided by the contemplated device 200.

This contemplated architecture employing a thermochromic layer 106 made up of a plurality of microdisks 202 is tunable and spectrally-selective, while also being much more resistant to the problems caused by mismatched indices of thermal expansion. This is due, in part, to the spacing between microdisks 202.

Figure 3:
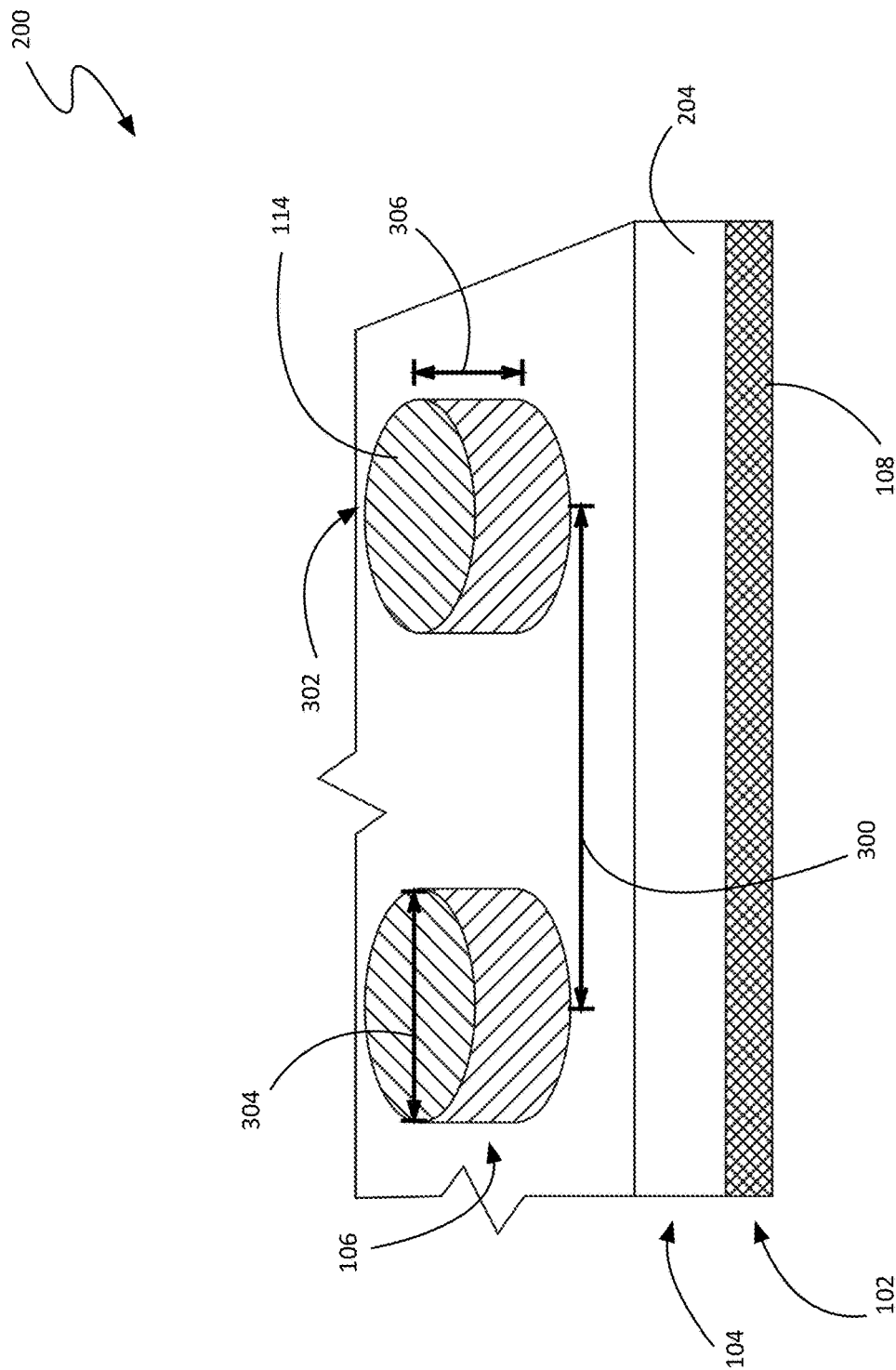
FIG. 3 is a close-up schematic view of the layered thermochromic device of FIG. 2.

FIG. 3 is a close-up schematic view of the non-limiting example of a layered thermochromic device shown in FIG. 2. In some embodiments, these microdisks 202 may be pure $VO_2$ 114, while in other embodiments, the microdisks 202 may comprise both $VO_2$ 114 and pure vanadium, with the pure vanadium between the insulator and the $VO_2$ 114. The method of fabrication will be discussed in greater detail with respect to FIGS. 5 and 6, below.

As shown, each microdisk 202 of the plurality of microdisks 202 has a height 306 (i.e., the thickness of the thermochromic layer 104). In some embodiments, including the non-limiting example shown in FIGS. 2 and 3, each microdisk 202 may have a circular cross section 302 having a diameter 304. Other embodiments may comprise microdisks 202 with a cross-section having less symmetry (e.g., oval, polygon, etc.). In still other embodiments, the plurality of microdisks 202 may comprise subsets that each have a different cross section.

Those skilled in the art will recognize that the methods used to create the microdisks 202 (to be discussed below in the context of FIGS. 5 and 6), in some embodiments, can result in small variances in the shape of the fabricated structure, and that claiming that the microdisks 202 have a cross section 302 of a particular shape allows for the small variances inherent to the fabrication method used, be it photolithography or otherwise.

In some embodiments, the $VO_2$ microdisks 202 are deposed in a uniform, repeating pattern having a period 300. While the non-limiting example shown in FIGS. 2 and 3 employs a repeating pattern that is symmetric in along two orthogonal directions, other embodiments may employ repeating patterns with differing degrees or types of symmetry (e.g., a pattern having two periods, a pattern with radial symmetry, etc.).

According to various embodiments, the microdisks 202 may be one or more orders of magnitude wider than they are tall. As a specific example, in one embodiment, the microdisks 202 may be 100 nm tall, with a diameter of 1.1 µm and a period of 1.6 µm. As will be discussed below, various aspects of the device's 200 properties may be tuned by the diameter 304, height 306, and period 300 of the thermochromic microdisks 202.

Figure 4:
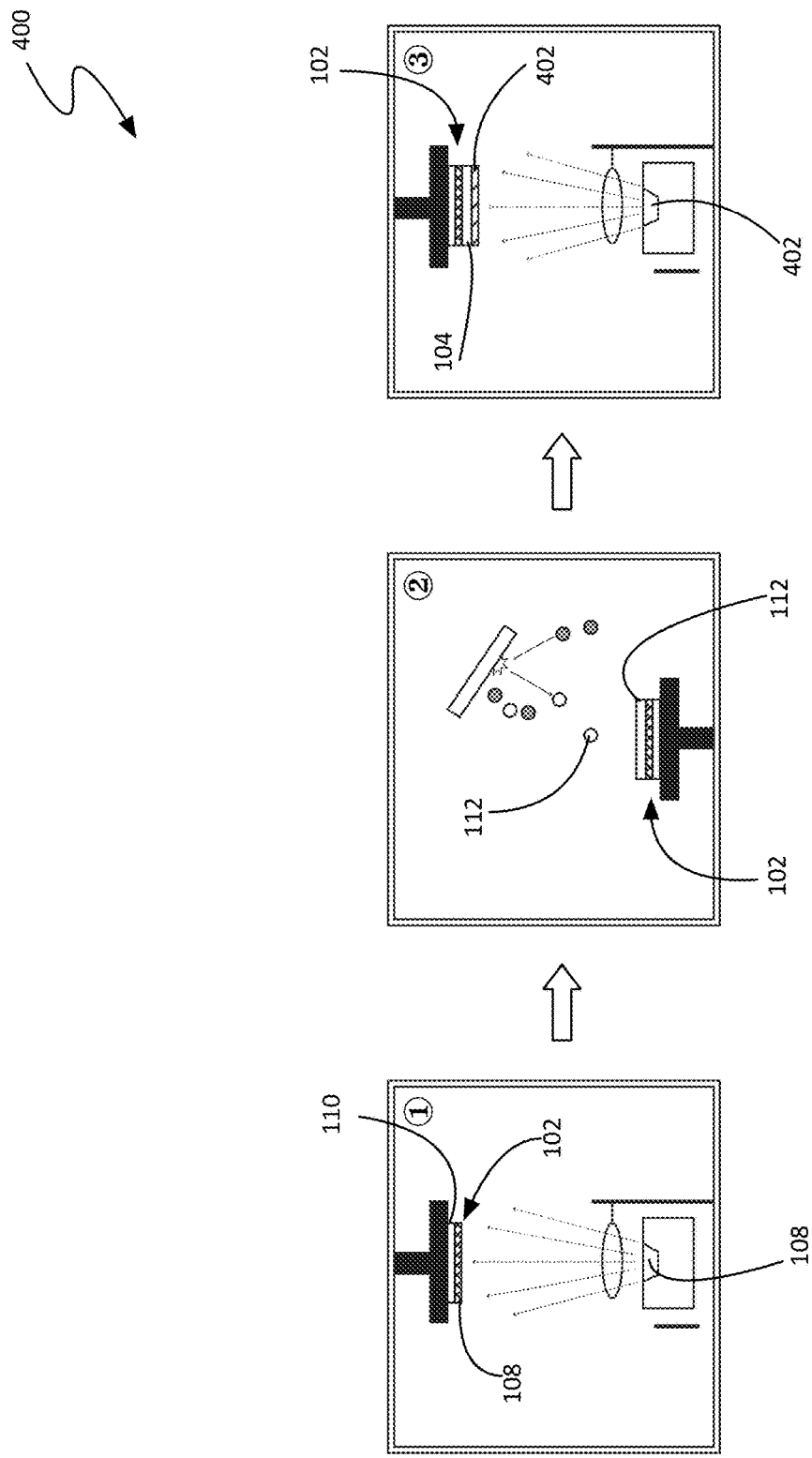
FIG. 4 is a process flow of a method for fabricating a layered thermochromic device for enhanced infrared emission.

FIG. 4 shows a process flow of a non-limiting example of a method 400 for fabricating a layered thermochromic device 100 for enhanced infrared emission and dynamic thermal control. This fabrication method 400 readily allows for various thicknesses of the different layers to allow for a tunable device 100 for whatever requirements are needed for a specific application. It is important to note that the following exemplary fabrication process is provided with specific layer thicknesses. These thicknesses should not be taken as a limitation, but rather a non-limiting example. As previously stated, the layer thicknesses may be adjusted to tune various properties of the device 100 for specific applications.

First, 200 nm of aluminum 108 is deposited via electron beam evaporation (e.g., using a Lesker PVD75 Electron Beam Evaporator, etc.) from aluminum pellets (e.g., 99.99% pure) onto a silicon substrate 110. See 'circle 1'. As a specific example, in one embodiment, the substrate 110 is a 385-µm-thick double-side-polished lightly-doped silicon substrate of 1 inch squares. The silicon substrates 110 are pre-cleaned with isopropyl alcohol and blow dried with compressed nitrogen gas. According to various embodiments, the base pressure of the deposition chamber may be $1 \times 10^{-6}$ Torr and the deposition rate may be maintained at 2.5 Å/s throughout the deposition.

After the formation of the metallic layer 102, a silicon spacer layer 104 is deposed on the metallic layer 102 (i.e., aluminum 108 on a silicon substrate 110) through RF magnetron sputtering (e.g., using a Lesker PVD75 Sputterer, etc.) from an undoped monocrystalline silicon target. See 'circle 2'. According to various embodiments, the base pressure of the sputtering chamber may be $5 \times 10^{-7}$ Torr and the deposition pressure may be held at 7.0 mTorr. According to various embodiments, a power of 135 W is used for the deposition, which may yield a silicon deposition rate of 0.4 Å/s. Due to concerns with substrate heating, in some embodiments, the silicon 112 may be deposited in three 150-200 nm intervals, with half an hour allotted for substrate cooling in between each interval. The vacuum remains unbroken throughout the entire silicon spacer deposition, in some embodiments.

Finally, a $VO_2$ 114 thin film (i.e., the thermochromic layer 106) is prepared on the spacer layer 104, opposite the metallic layer 102, using a two-stage thermal oxidation process. In the first step, a pure vanadium 402 film is deposited on the spacer layer 104 using electron beam evaporation (e.g., with a Lesker PVD75 Electron Beam Evaporator, etc.). See 'circle 3'. Then the vanadium 402 precursor thin film is directly oxidized. The formation of $VO_2$ 114 after vanadium 402 has been deposed on the spacer layer 104 will be discussed in greater detail with respect to FIG. 6, below.

In other embodiments, one or more of these layers may be fabricated using different methods. For example, in some embodiments, at least one of the Al layer (i.e., metallic layer 102) and the Si layer (i.e., spacer layer 104) may be deposited with other methods known in the art. Sputtering is well known in the art, and is scalable to cover large areas and nonplanar geometries. It should also be noted that in the context of the present description and the claims that follow, stating that a layer or material is "deposed" on another layer or material, without greater specificity, should not be taken to limit the fabrication method to those traditionally referred to as a deposition (e.g., vapor deposition, etc.). Instead, In some embodiments, the $VO_2$ 114 thin film layer may be fabricated with a process other than the two-stage thermal oxidation to be discussed in the context of FIG. 6. For example, in some embodiments, the $VO_2$ 114 can be deposited by methods such as reactive magnetron sputtering or vapor deposition, as is known in the art. However, it should be noted that the furnace oxidation technique for fabricating the thermochromic $VO_2$ layer contemplated herein is advantageously scalable.

Figure 5:
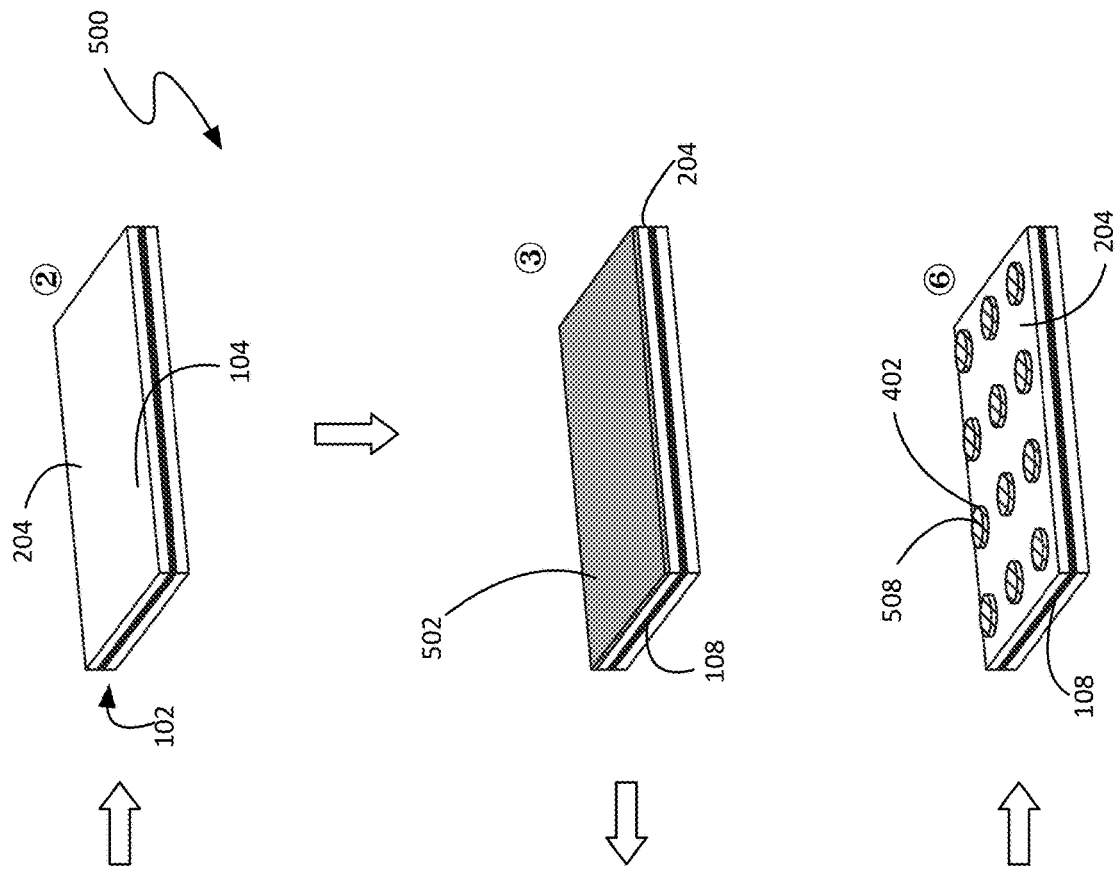
FIG. 5 is a process flow showing various stages of a method for fabricating a layered thermochromic device having microdisks.
Figure 5:
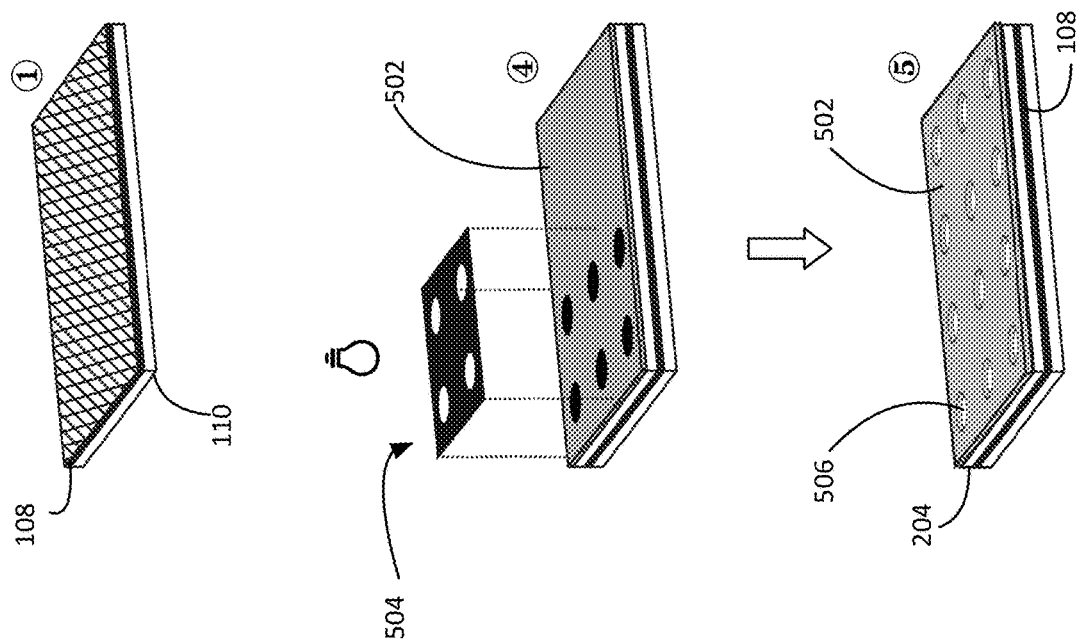

FIG. 5 is a process flow showing a non-limiting example of various stages of a method 500 for fabricating a layered thermochromic device 200 having microdisks 202. According to various embodiments, the device 200 is fabricated starting with a metallic surface (i.e., metallic layer 102). In some embodiments, the metallic layer 102 may be part of a larger structure. In other embodiments, the metallic layer 102 may be a metal film deposed on a substrate 110. See 'circle 1'. As a specific example, in one embodiment, starting with a lightly doped silicon wafer (e.g., resistivity >20 Ω·cm, from Virginia Semiconductor Inc.), a 200 nm thick layer of aluminum 108 is deposited using electron beam evaporation (e.g., Lesker PVD75 Electron Beam Evaporator) at a deposition rate of 1 Å/s and pressure of 5×10−6 Torr.

Next, an insulating spacer layer 104 is deposed on the metallic layer 102. See 'circle 2'. In some embodiments, the insulating spacer layer 104 is a layer of $HfO_2$ 204. As a specific example, in one embodiment, a 300 nm thick layer of $HfO_2$ 204 is deposited by atomic layer deposition (e.g., Cambridge Savannah ALD Deposition Tool) with a tetrakis-(dimethylamino)hafnium (TDAHF) precursor at a growth rate of 1 Å per cycle.

According to various embodiments, the $VO_2$ microdisks 202 may be fabricated using an etch-free, scalable process that begins with the application of a layer of photoresist on the spacer (e.g., $HfO_2$ 204) layer 104. See 'circle 3'. As a specific example, in one embodiment, photoresist (e.g., AZ 3312, AZ Electronic Materials) is spin coated on the $HfO_2$ layer 204 with a speed of 5000 rpm.

The photoresist 502 is then exposed using a photomask 504 (see 'circle 4') to create holes 506 in the photoresist 502 (see 'circle 5'), as is known in the art. These holes 506 will act as molds for the $VO_2$ microdisks 202. In some embodiments, in order to achieve large areas, translational patterning may be implemented during the photolithography process with a stepper, as illustrated in FIG. 5. As a specific example, in one embodiment, the photoresist 502 is exposed in a GCA 8500 Stepper with 5× size reduction from the patterns on a photomask 504 (e.g., chrome mask on quartz substrate, Photo Science Inc.).

Once the holes 506 have been formed in the photoresist layer 502, the $VO_2$ microdisks may be formed. In some embodiments, this is accomplished by first depositing pure vanadium 402, which is then oxidized to form $VO_2$ 114. This is advantageous over conventional methods of creating micro-structures of $VO_2$ 114, which require the use of etching on $VO_2$ 114 thin films, a process that is not practical on large scales, and which also results in decreased conformality among the microdisks 202.

As a specific example, in one embodiment, pure vanadium 402 (e.g., 99.99% purity, from Kurt J. Lesker Co.) is deposited on the photoresist 502 and the holes 506 with a thickness of 50 nm by electron beam evaporation at a deposition rate of 0.8 Å/s and pressure of 5×10−6 Torr. The photoresist 502 is then removed, leaving vanadium microdisks 508 on the surface of the spacer layer 104. See 'circle 6' Continuing the specific example, in the lift-off process, the residual photoresist 502 and extra vanadium 402 are removed by soaking in acetone and sonicating at room temperature for 1 minute.

Finally, the $VO_2$ 114 is formed by directly oxidizing the vanadium microdisks 508, according to various embodiments. This oxidation process will be discussed further in the context of FIG. 6, below. Continuing the specific example, the height 306 of the vanadium microdisks 508 is about 50 nm before oxidation but doubles to 100 mm after oxidation. Experimental results have shown that the period 300 and diameter 304 of the microdisks 202 does not change and the circular profile 302 is well preserved during the oxidation from V to $VO_2$ using this method.

Those skilled in the art will note that, in some embodiments, some or all of the layers discussed above may be fabricated using different deposition and fabrication methods known in the art to arrive at the same final structure. The specific examples given should in no way be considered as limiting.

Figure 6:
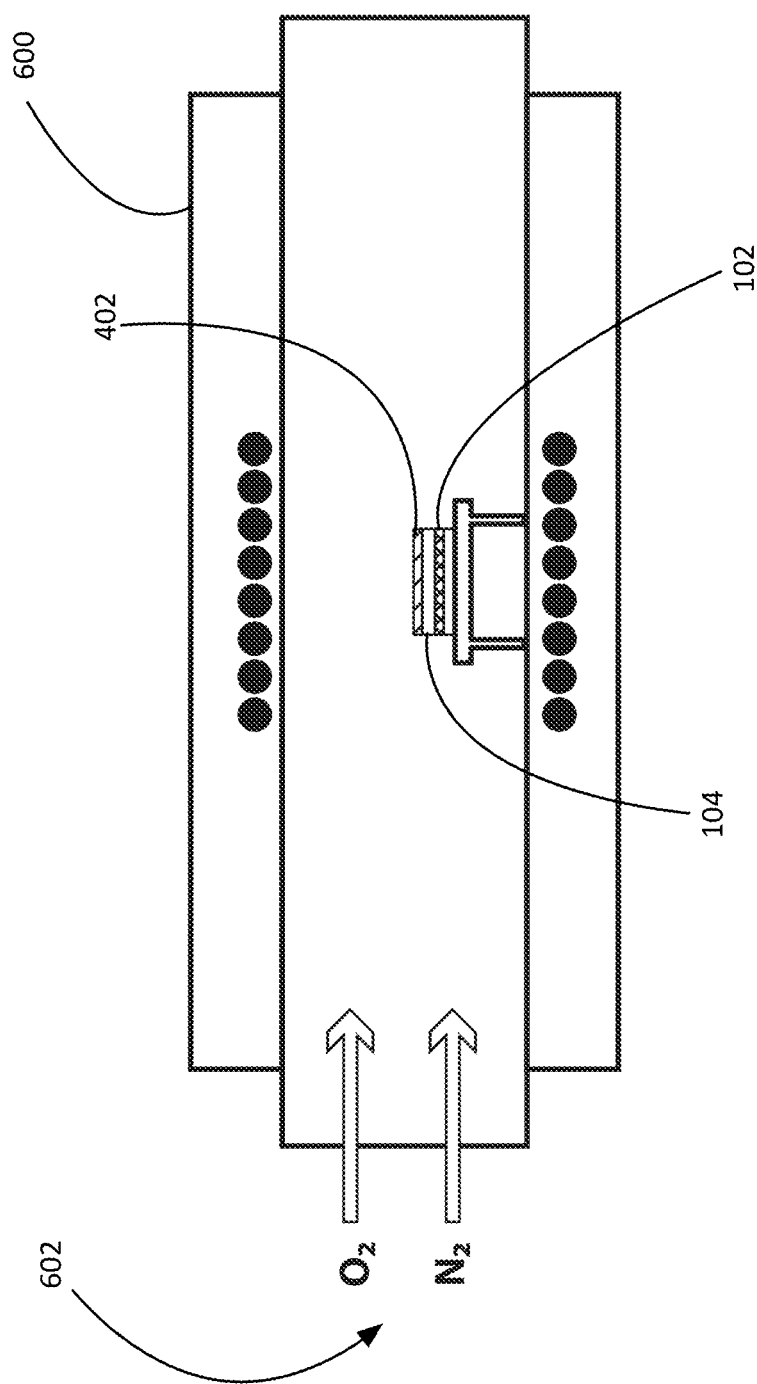
FIG. 6 is a schematic view of a furnace used for fabricating a layered thermochromic device.

As previously mentioned, one of the advantages the contemplated device 200 has over other $VO_2$-based materials is its thermal stability and resilience to thermal stress. The thermal stability of the contemplated device 200 has been tested by repeatedly heating and cooling samples for one hundred cycles. The spectral emittance at both low and high temperatures rarely changes, showing good thermal stability of the device In some embodiments, a thermochromic layer 106 of $VO_2$ 114 may be deposited directly on the spacer layer 104. In other embodiments, this $VO_2$ layer may be formed by oxidizing a vanadium layer that has been deposited on the spacer layer 104, as discussed in the context of both FIG. 4 and FIG. 5, in thin film and microdisk-type embodiments. FIG. 6 is a schematic view of a furnace used for the direct oxidation of vanadium as part of fabricating a non-limiting example of a layered thermochromic device. Specifically, after vanadium has been deposed on the spacer layer 104 (i.e., 'circle 3' of FIG. 4, 'circle 6' of FIG. 5), the $VO_2$ 114 may be formed by heating the device (i.e., device 100, device 200) in a furnace 600 under a nitrogen/oxygen flow 602, as shown.

As a specific example, in one embodiment, the device 100 shown in 'circle 3' of FIG. 4 is oxidized in a quartz tube furnace 600 (e.g., a Thermco Minibrute tube furnace, etc.) at 300° C. for three hours, under a flow 602 of $O_2$ and $N_2$. As another specific example, in one embodiment, the device 200 shown in 'circle 6' of FIG. 5 is oxidized in the quartz tube furnace 600 at 300° C. for eight hours, under a flow 602 of $O_2$ and $N_2$. In both embodiments, the $O_2$ flow rate may be 0.5 SLPM and the $N_2$ flow rate may be 60 SLPM throughout the oxidation.

In some embodiments, the vanadium 402 or vanadium microdisks 508 may be entirely oxidized into $VO_2$ 114 or $VO_2$ microdisks 202. In other embodiments, the oxidation may be partial, resulting in a layer of vanadium 402 laying between the $VO_2$ 114 and the spacer layer 104.

Figure 7A:
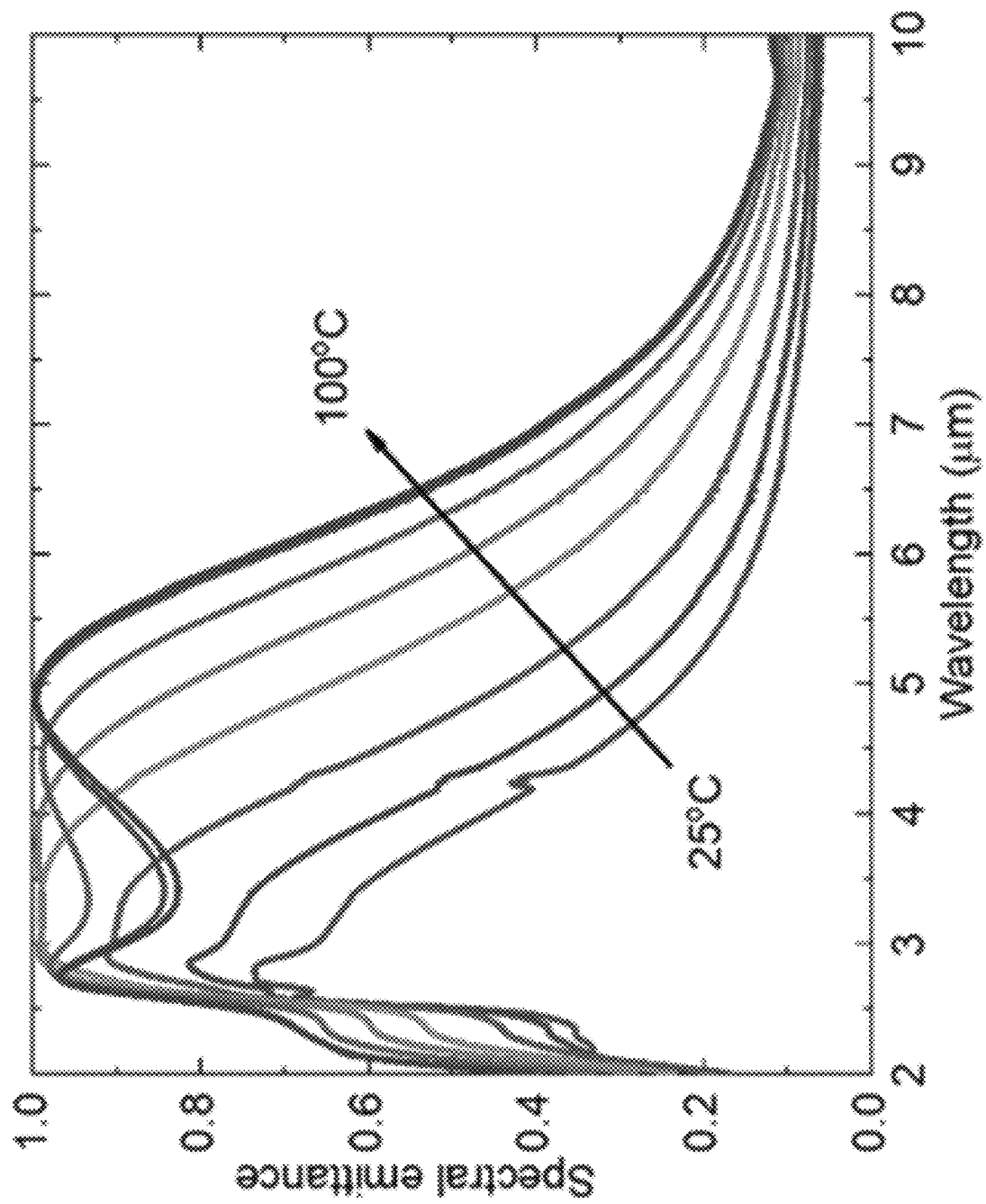
FIGS. 7A-7E are various measures of the performance of a layered thermochromic device having a microdisk architecture.
Figure 7B:
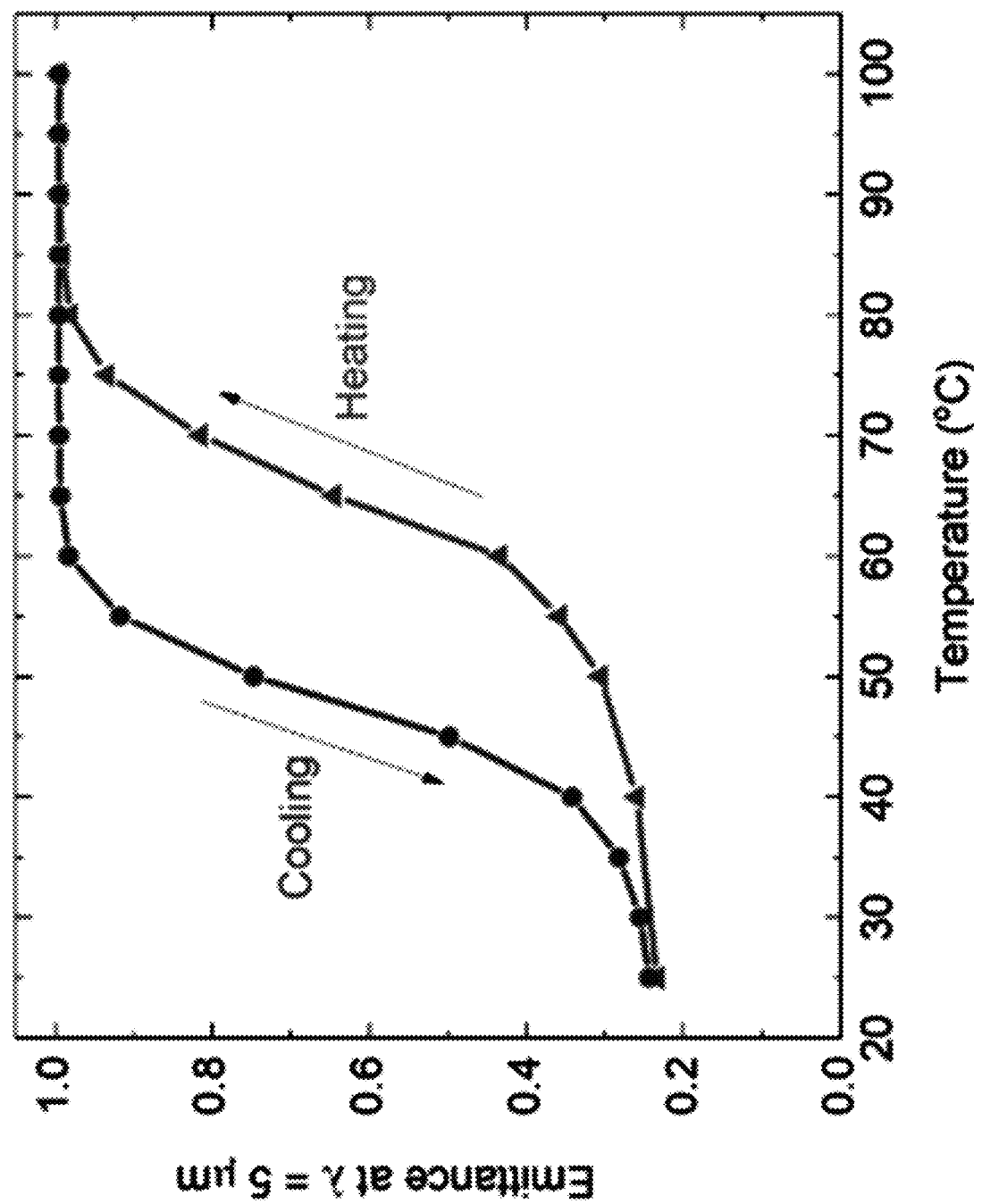
Figure 7C:
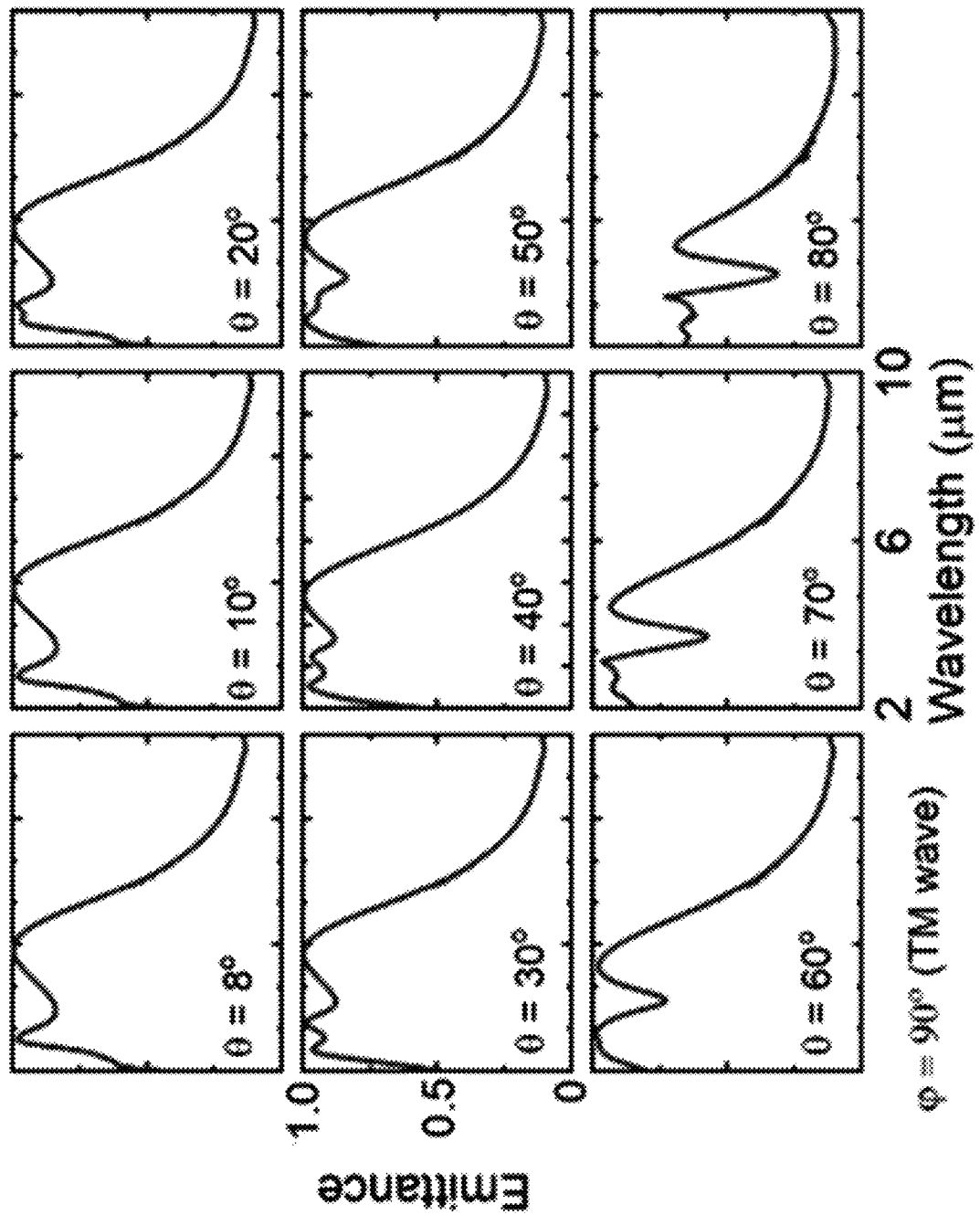
Figure 7D:
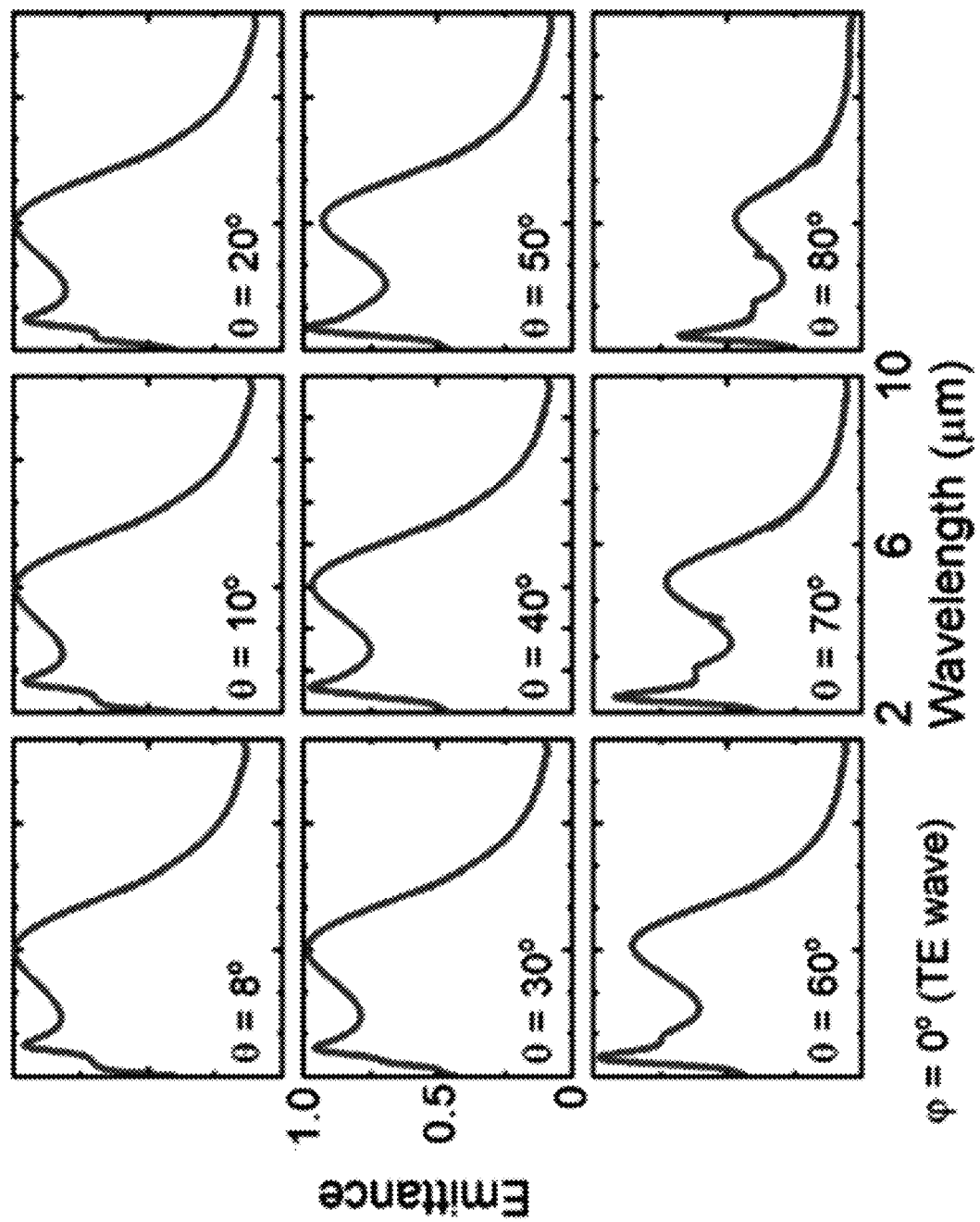
Figure 7E:
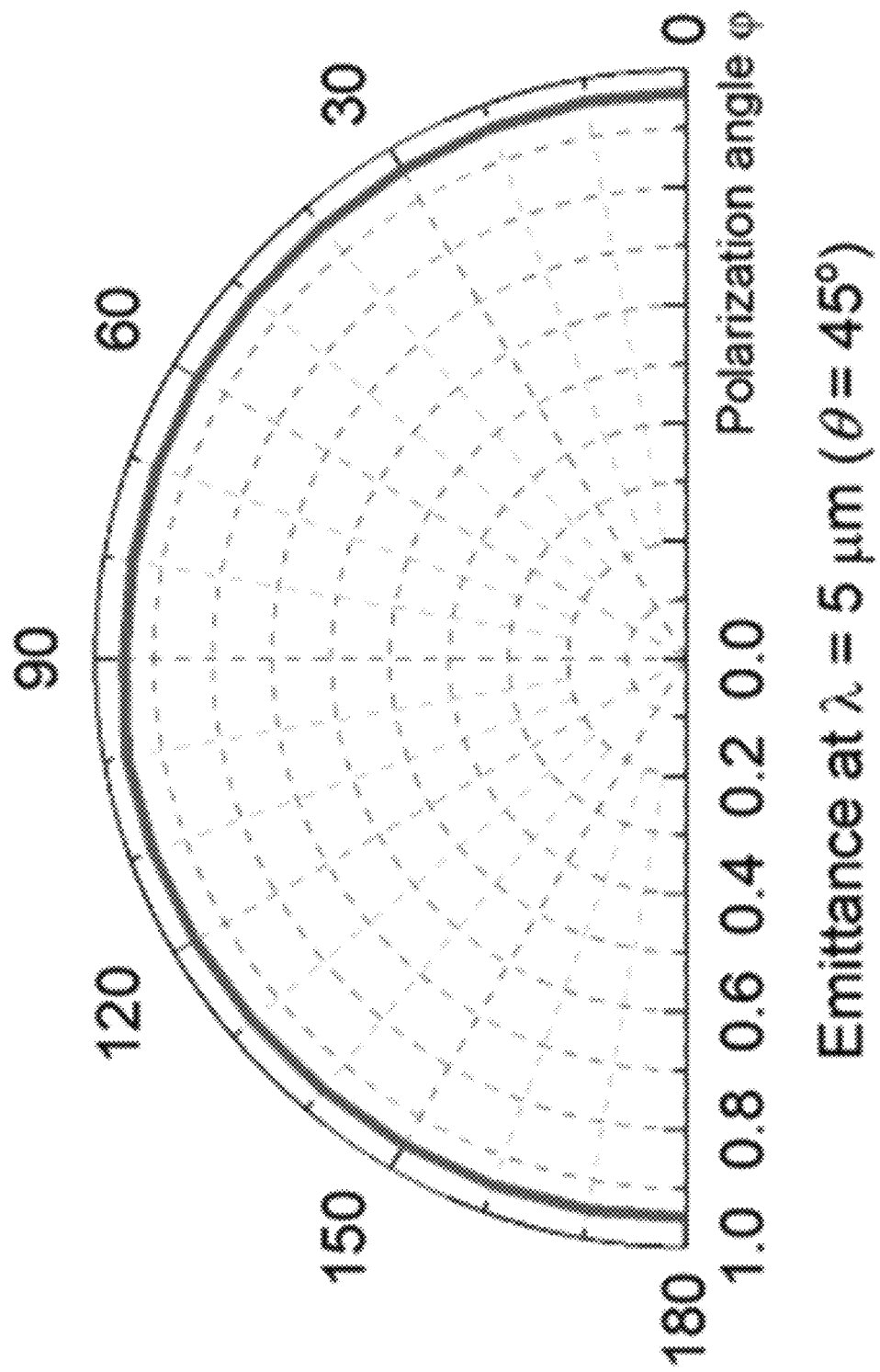

FIGS. 7A-7E provide various measures of the performance of the embodiment previously described as a specific example, a non-limiting example of a layered thermochromic device 200. Specifically, FIG. 7A comprises FTIR measurements at different temperatures (i.e., 25, 50, 60, 65, 70, 75, 85, and 100° C.) with unpolarized light and near-normal incidence. FIG. 7B shows the emittance of the device 200 at $\lambda$=5 µm, as a function of temperature during the heating and cooling cycles. FIGS. 7C and 7D show incident angle $\theta$ dependent measurement of the emittance for the device 200 with metallic $VO_2$ under TM (i.e., transverse magnetic waves; see FIG. 7C) and TE (i.e., transverse electric waves; see FIG. 7D) waves. FIG. 7E shows emittance at $\lambda$=5 µm, as a function of polarization angle $\gamma$ at $\theta$=45°.

As shown in FIG. 7A, when the temperature increases, the spectral emittance EX, measured at near-normal (i.e., $\theta$=8°) gradually increases. Within the wavelength range from 2 to 10 µm, the device 200 shows relatively low emittance and one emission peak around the wavelength of 7 µm when the $VO_2$ 114 is insulating at 25° C. Once heated above the $VO_2$ transition temperature where the insulating $VO_2$ becomes metallic, the tunable device 200 exhibits dramatic changes in spectral emittance mainly due to the appearance of another major emission peak at a wavelength of $\lambda$≈5 µm. At temperature of 100° C., the emittance at both peak wavelengths of 7 and 5 µm almost reaches unity as a black surface. According to various embodiments, the spectral emittance of the tunable device 200 exhibits a significant variation with temperature, in particular, the emittance is much enhanced at higher temperatures after $VO_2$ 114 transits from insulator to metal. The pronouncedly enhanced infrared emittance spectrum, including the unity emittance at $\lambda$=5 µm, is due to the resonance excitation of magnetic polariton (MP) with metallic $VO_2$.

As shown in FIG. 7B, at $\lambda$=5 µm of the thermally switchable peak, the temperature-dependent emittance changes from 0.2 to 1 going from 25 to 100° C. FIG. 7B also shows a typical hysteresis of ~20° C. upon $VO_2$ phase transition, between the heating and cooling curves.

A diffuse surface is usually preferred for radiative heat dissipation, to maximize the thermal emission radiated hemi-spherically to the environment. FTIR measurements at different incident angles $\theta$ and polarization angles $\varphi$ demonstrate the angular and polarization dependency of the tunable device 200 emitter. FIGS. 7C and 7D provide the measured spectral emittance of the specific, non-limiting example, with metallic $VO_2$ (100° C.) at different $\theta$ under transverse magnetic (TM, i.e., $\varphi$=90°) and transverse electric (TE, i.e., $\varphi$=0°) waves, respectively.

Under TM waves (FIG. 7C), the emittance peak near $\lambda$=7 µm is sensitive to incident angles, and splits into several peaks as the incident angle increases. On the other hand, the emittance peak at $\lambda$=5 µm with metallic $VO_2$ is nearly angle-independent in both magnitude and location for $\theta$<70°. The diffuse behavior of emission or absorption is one of the typical features of the MP excitation. Generally, MP can only be excited under TM waves (but not TE waves) for a 1D structure. The contemplated device 200 overcomes this limitation by employing symmetric structures of three dimensional microdisk arrays in order to maximize the thermal emission in both polarizations. As shown in FIG. 7D for TE waves, the measured spectral emittance changes little from normal direction to $\theta$=60°.

FIG. 7E illustrates the polarization independency of the $VO_2$ device 200. As shown, the peak emittance at $\lambda$=5 µm with metallic $VO_2$ is measured at a fixed incidence angle $\theta$=45° for multiple polarization angles $\varphi$ from 0° to 180°. The high emittance is almost constant around 0.95, independent of polarization angles.

With the temperature-dependent tunable infrared emittance demonstrated in FIGS. 7A-7E, the contemplated $VO_2$ device 200 holds great potential for enhancing radiative heat dissipation at high temperatures in a range of applications.

In some embodiments, such as the specific (though non-limiting) example provided above, the measured spectral emittance of the device 200 exhibits a total emittance enhanced more than threefold upon $VO_2$ phase change, in addition to diffuse emission behavior with angular and polarization-independence. The augmentation of the infrared emittance (i.e., the switchable thermal emission peak at wavelength of $\lambda$=5 µm) is a consequence of thermally exciting or suppressing MP with either metallic or insulating $VO_2$. The enhanced radiative heat dissipation of the tunable $VO_2$ device 200 is almost a sixfold enhancement in radiative thermal conductance upon $VO_2$ phase transition and more than threefold improvement over that of a static $V_2O_5$ emitter.

In some embodiments, the various properties of the contemplated devices 200 may be modified by manipulating various aspects of the device 200. For example, the radiative cooling performance of the device 200 can be modified or improved by tailoring the switchable $VO_2$ emittance peak to best match the blackbody spectrum around the given operating temperatures, by changing microdisk geometry. In some embodiments, the location or wavelength of peak emissivity may be tuned by varying the diameter 304 of the microdisks 202. In other embodiments, the minor emissivity peaks may be manipulated by modifying the period 300 of the plurality of microdisks 202.

In some embodiments, the device 200 may be modified by manipulating the phase change temperature of the $VO_2$ microdisks 202. For example, the phase change temperature of $VO_2$ may be lowered by doping the microdisks 202 with transition metals like tungsten, to better serve applications implemented around room temperatures.

Figure 8:
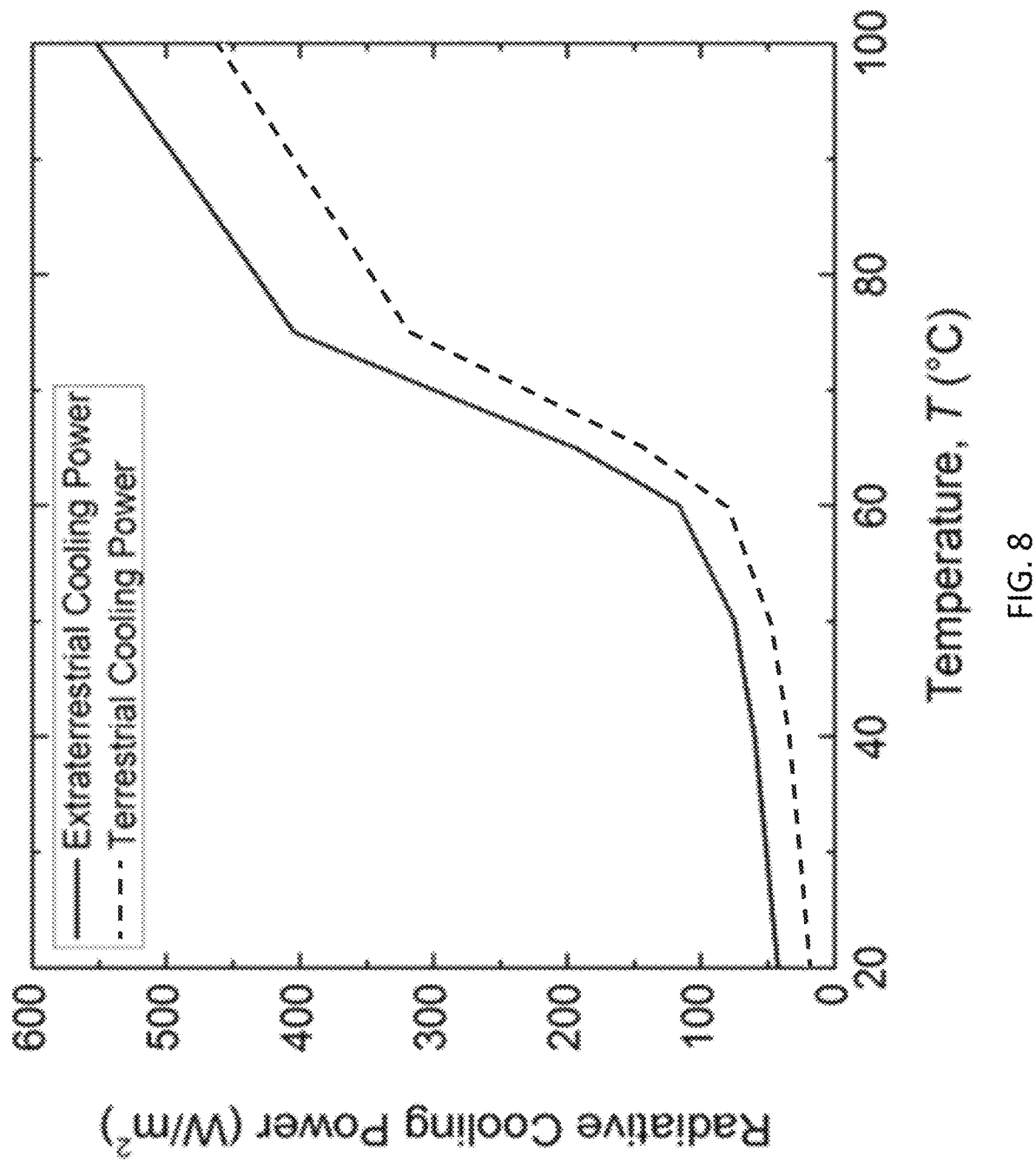
FIG. 8 shows calculated radiative cooling powers the layered thermochromic device of FIG. 1.

FIG. 8 shows calculated radiative cooling powers for extraterrestrial applications in outer space at 7 K (solid line) and for terrestrial applications with ambient temperature at 300 K (dashed line) for a non-limiting example of the contemplated thermochromic device 100. As shown, a significant switch upon the $VO_2$ phase transition can be observed. For the extraterrestrial case, a cooling power difference of 510 W/m² is achieved from 20° C. to 100° C., whereas for the terrestrial case a cooling power difference of 445 W/m² is achieved. This clearly indicates good potential to use this non-limiting embodiment of the tunable $VO_2$ device 100 as smart radiative cooling device for both terrestrial and extraterrestrial thermal control applications. In practical systems, a solar reflector can be incorporated to minimize the solar absorption during daytime and maximize the performance of the $VO_2$-based dynamic radiative cooler. With respect to space applications, heat rejection, temperature stability, and resistance to thermal cycling has been confirmed for hot and cold outer space environments (e.g., pressure below $1 \times 10^{-5}$ Torr, cryogenic temperatures, 200° C. temperatures, etc.).

In some embodiments, the $VO_2$ phase transition temperature may be reduced to near room temperature, making the device 100 practical for building thermal control applications. This lowering of the transition temperature might be achieved via impurity doping (e.g., tungsten, etc.) and defect engineering with argon ion irradiation, according to various embodiments. As an option, doping may be performed during the fabrication of the $VO_2$ layer 106. As a specific example, in one embodiment, the $VO_2$ layer 106 may be doped with tungsten while the $VO_2$ layer 106 is formed using a reactive magnetron sputtering process, a fabrication method for $VO_2$ 114 known in the art. In other embodiments, the doping may occur as part of the two-step furnace oxidation method (e.g., tungsten doping via diffusion process, etc.).

Figure 9A:
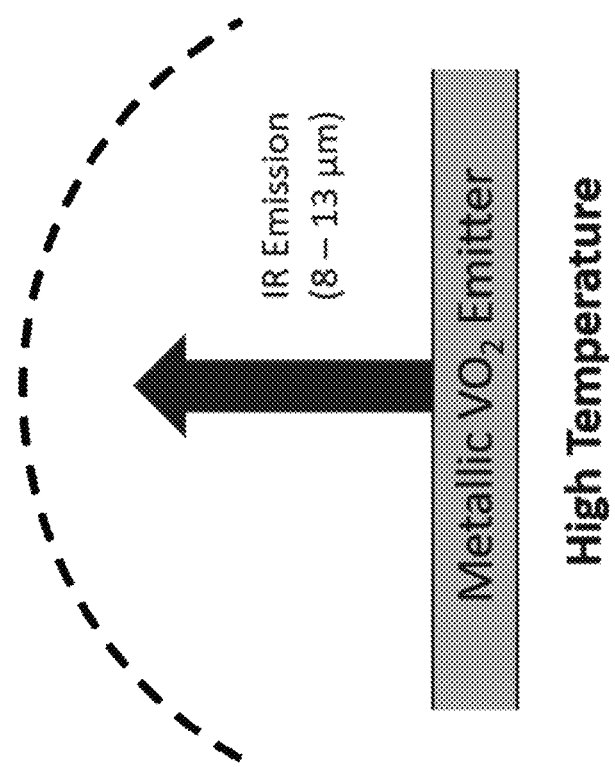
FIGS. 9A-9D are schematic views showing a layered thermochromic device in operation.
Figure 9B:
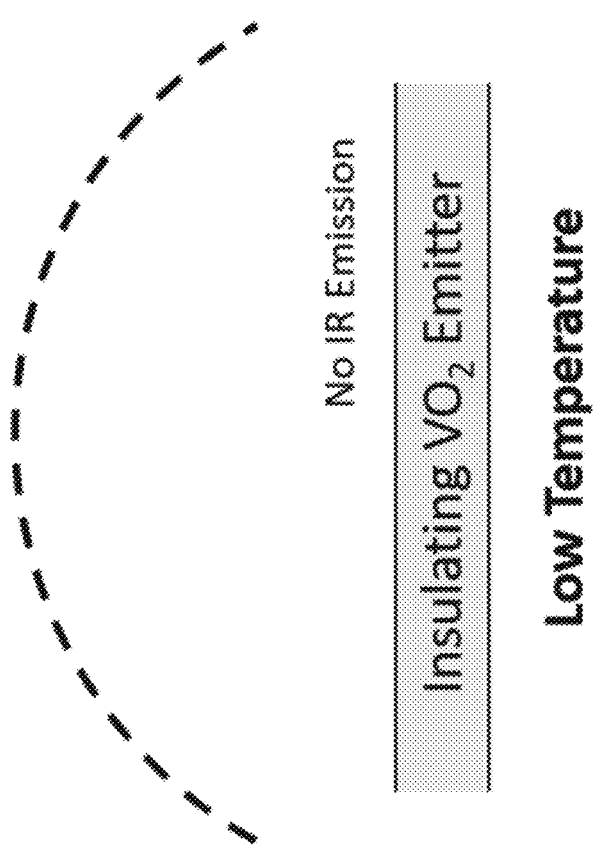
Figure 9C:
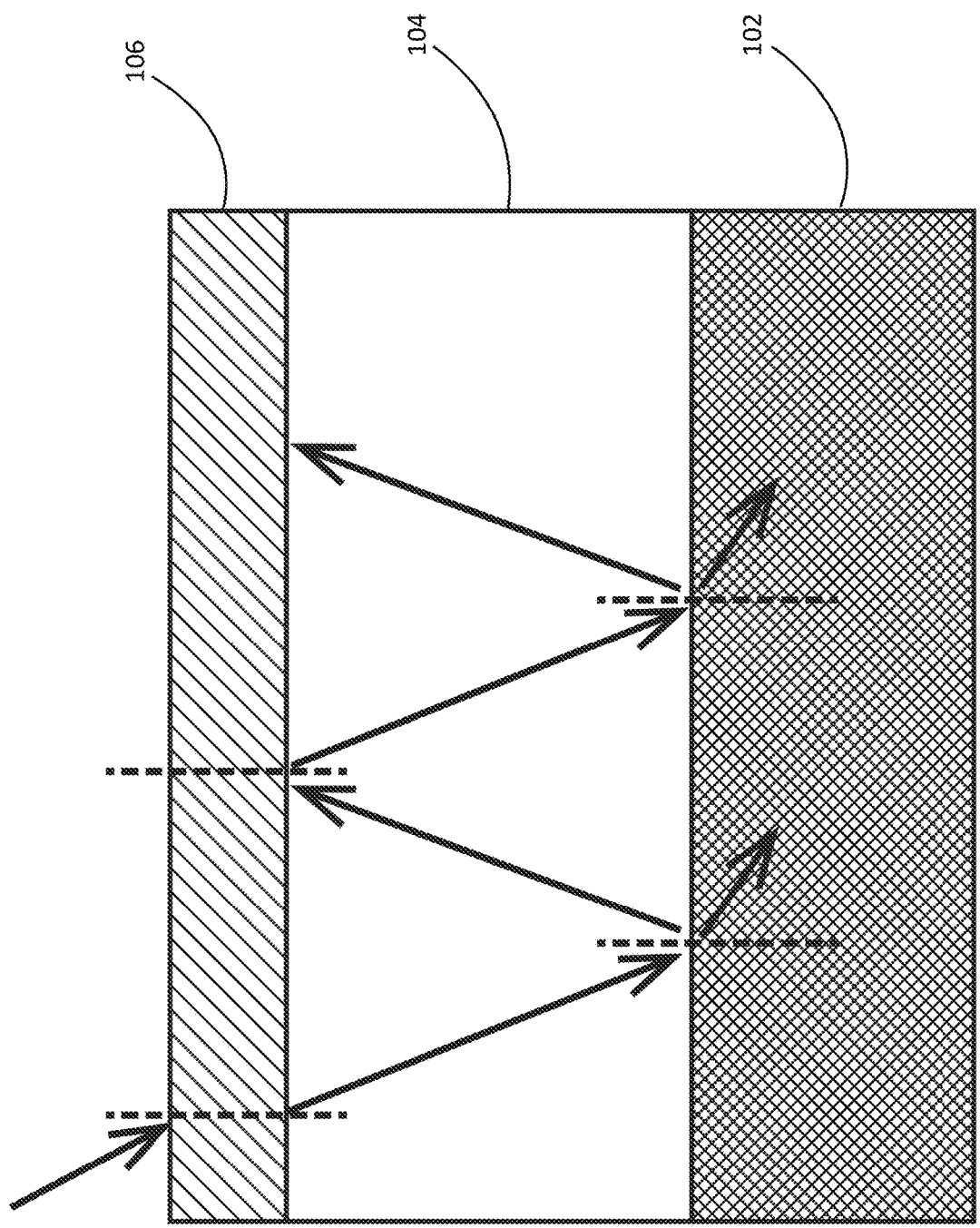
Figure 9D:
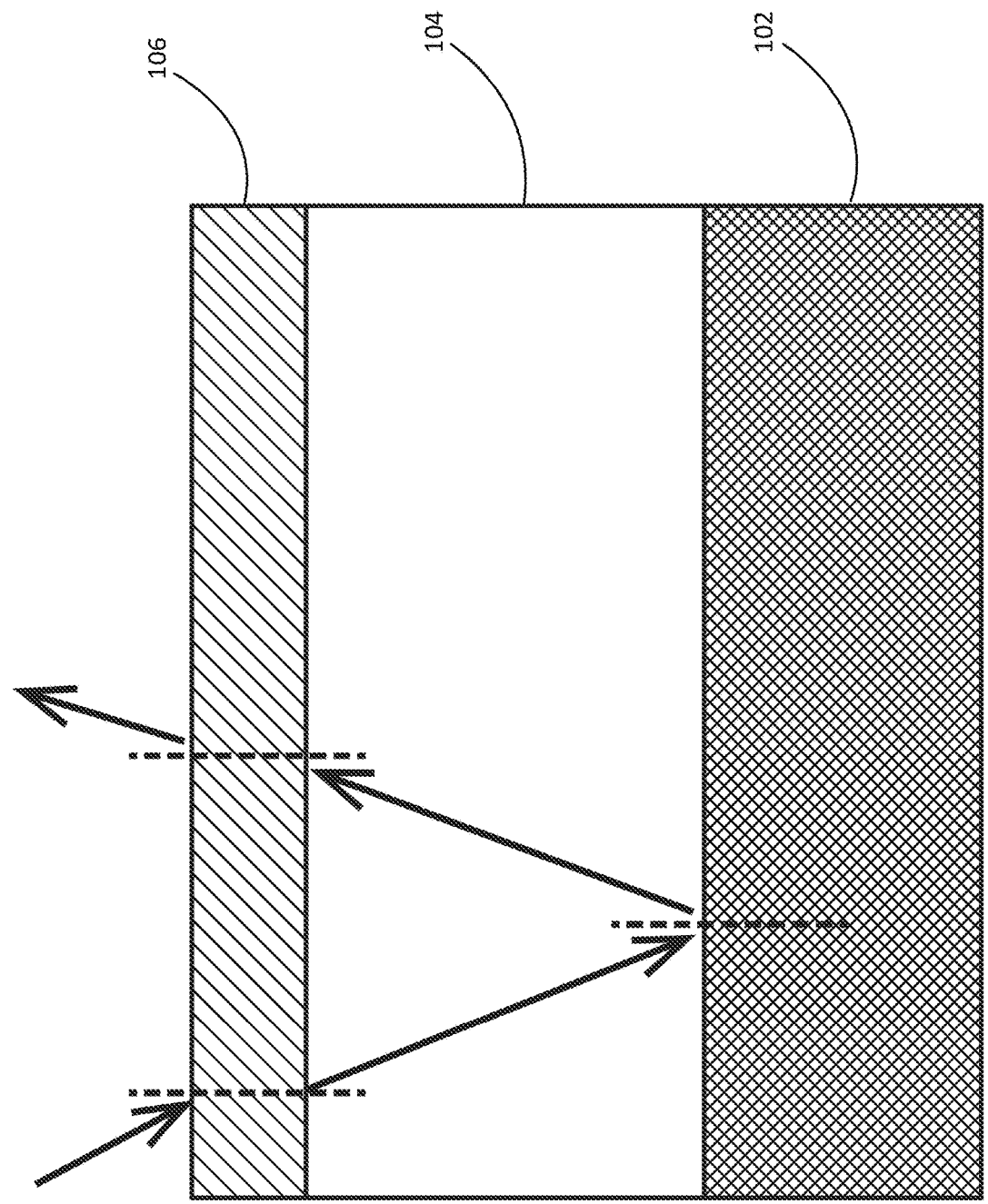

FIGS. 9A-9D are schematic views of a non-limiting example of a layered thermochromic device 100 with a thin-film architecture. Specifically, FIGS. 9A and 9B show dynamic radiative cooling at high and low temperature, respectively. FIG. 9C shows the behaviors of the tunable device 100 with metallic $VO_2$ at high temperatures, while FIG. 9D shows the same device with insulating $VO_2$ at low temperatures.

A well-performing selective radiative cooling device 100 should have high infrared (IR) emittance at high temperatures and low IR emittance at low temperatures. In some embodiments, the device 100 may have selectively high emittance around $\lambda = 10$ μm, which corresponds to the peak thermal emission of a body at room temperature. When the $VO_2$ 114 is metallic, the Fabre-Perot cavity is formed and the structure has high broadband emittance around the target wavelength. See FIG. 9C. The emission enhancement also spans the 8-19 μm atmospheric window, which is desirable for terrestrial building cooling. On the other hand, when the $VO_2$ 114 is insulating at low temperatures, the emittance of the device 100 is minimized. See FIG. 9D. This is because the $VO_2$ 114 and silicon 112 layers are semi-transparent, while the aluminum substrate 108 is highly reflective. This change in emittance yields temperature-dependent heat rejection that can be used to design passive thermal management systems.

According to various embodiments, a fourfold increase in total emittance is observed with the device 100, when increasing the temperature from room temperature to 100° C. The infra-red (IR) emission peak is around 10 μm, which is within the preferred IR atmospheric window of 8-14 μm where there is relatively little absorption of terrestrial thermal radiation by atmospheric gases and where the emission can escape without absorption towards space.

With respect to the specular near-normal spectral reflectance, at room temperature the reflectance is over 90% for nearly all of the mid-infrared wavelength range, indicating that the emittance is less than 10% over most of the wavelength spectrum of interest, according to various embodiments. On the other hand, at 100° C., the spectral reflectance is only 5% near $\lambda = 9$ μm, indicating that the emittance is 95%.

It will be understood that implementations are not limited to the specific components disclosed herein, as virtually any components consistent with the intended operation of a scalable layered thermochromic device and method for making the same may be utilized. Accordingly, for example, although particular materials and fabrication methods may be disclosed, such components and methods may comprise any shape, size, style, type, model, version, class, grade, measurement, concentration, material, weight, quantity, and/or the like consistent with the intended operation of a scalable layered thermochromic device and method for making the same may be used. In places where the description above refers to particular implementations of a layered thermochromic device and method for making the same, it should be readily apparent that a number of modifications may be made without departing from the spirit thereof and that these implementations may be applied to other devices and chromogenic materials.

What is claimed is:

1. A method for creating a layered thermochromic device for enhanced infrared emission, comprising:
   deposing a spacer layer on a metallic layer;
   deposing a thermochromic layer on the spacer layer opposite the metallic layer,
   wherein deposing the thermochromic layer on the spacer layer comprises:
   deposing vanadium on the spacer layer; and
   forming $VO_2$ coupled to the spacer layer through direct oxidation of the deposited vanadium by heating the device in a furnace under a nitrogen/oxygen flow,
   wherein deposing vanadium on the spacer layer comprises:
   spin coating the spacer layer with photoresist;
   exposing the photoresist with a photomask, creating a plurality of holes in the photoresist;
   deposing vanadium on the photoresist and the plurality of holes, filling the holes and forming vanadium microdisks on the spacer layer; and
   removing the photoresist and the vanadium deposed on the photoresist.

2. The method of claim 1, wherein the metallic layer is a layer of aluminum deposed on a silicon substrate.

3. The method of claim 1, wherein deposing the spacer layer on the metallic layer comprises deposing silicon upon the metallic layer through RF magnetron sputtering.

4. The method of claim 1, wherein deposing the spacer layer on the metallic layer comprises deposing an insulating layer of $HfO_2$ upon the metallic layer through atomic layer deposition.

5. The method of claim 1, wherein the vanadium is deposed using electron beam evaporation.

\* \* \* \* \*